(12) United States Patent
Zhang et al.

(10) Patent No.: US 11,372,734 B1
(45) Date of Patent: Jun. 28, 2022

(54) DATABASE RECOVERY BASED ON WORKLOAD PRIORITIES

(71) Applicant: INTERNATIONAL BUSINESS MACHINES CORPORATION, Armonk, NY (US)

(72) Inventors: Hong Mei Zhang, Beijing (CN); Xiaobo Wang, Beijing (CN); Shuo Li, Beijing (CN); Sheng Yan Sun, Beijing (CN); Mei Cai Zeng, Zhuhai (CN); Yi Bu Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/158,504

(22) Filed: Jan. 26, 2021

(51) Int. Cl.
*G06F 11/14* (2006.01)

(52) U.S. Cl.
CPC ...... *G06F 11/1469* (2013.01); *G06F 11/1451* (2013.01); *G06F 11/1471* (2013.01); *G06F 2201/80* (2013.01); *G06F 2201/82* (2013.01)

(58) Field of Classification Search
CPC .......... G06F 11/1448; G06F 11/1451; G06F 11/1458; G06F 11/1469; G06F 11/1471; G06F 2201/80; G06F 2201/82; G06F 11/1461; G06F 16/2358; G06F 16/2365; G06F 16/278; G06F 16/289
See application file for complete search history.

(56) References Cited

U.S. PATENT DOCUMENTS

| | | | |
|---|---|---|---|
| 6,065,018 A | 5/2000 | Beier et al. | |
| 6,732,123 B1 * | 5/2004 | Moore | G06F 11/1471 |
| 6,859,926 B1 * | 2/2005 | Brenner | G06F 9/5038 |
| | | | 718/100 |
| 7,325,161 B1 * | 1/2008 | Rakic | G06F 11/1458 |
| | | | 714/15 |
| 2005/0193248 A1 * | 9/2005 | Idei | G06F 11/2076 |
| | | | 714/13 |
| 2009/0171707 A1 | 7/2009 | Bobak et al. | |
| 2010/0115332 A1 | 5/2010 | Zheng et al. | |
| 2010/0211822 A1 | 8/2010 | Colaiacomo et al. | |
| 2012/0260256 A1 * | 10/2012 | De Faria | G06F 9/5011 |
| | | | 718/103 |
| 2015/0254264 A1 * | 9/2015 | Yu | G06F 16/2365 |
| | | | 707/703 |
| 2016/0154705 A1 * | 6/2016 | Dutch | G06F 11/1461 |
| | | | 707/686 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

*Primary Examiner* — Bryce P Bonzo
*Assistant Examiner* — Albert Li
(74) *Attorney, Agent, or Firm* — Stephanie Carusillo, Esq.; Blanche E. Schiller, Esq.; Heslin Rothenberg Farley & Mesiti P.C.

(57) ABSTRACT

Database recovery is based on workload priorities. A database workload is divided into a plurality of workload groups. A workload group of the plurality of workload groups is selected for recovery, in which the selecting is based on a priority of the workload group. One or more recovery actions are performed for the workload group selected for recovery.

20 Claims, 24 Drawing Sheets

(56) References Cited

U.S. PATENT DOCUMENTS

| | | | |
|---|---|---|---|
| 2017/0024285 A1* | 1/2017 | Bell | G06F 9/5088 |
| 2017/0109246 A1* | 4/2017 | Chien | G06F 16/182 |
| 2017/0132091 A1* | 5/2017 | Leshinsky | G06F 11/1471 |
| 2019/0065326 A1* | 2/2019 | Mehrotra | G06F 16/24578 |
| 2019/0258551 A1 | 8/2019 | Cors et al. | |
| 2020/0088575 A1 | 3/2020 | Dutch et al. | |

* cited by examiner

```
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  ┌─────────────────────────────────────────────────────────┐  │
│  │ DIVIDING A DATABASE WORKLOAD INTO A PLURALITY OF WORKLOAD GROUPS │  │
│  │                                                         │  │
│  │ SELECTING A WORKLOAD GROUP OF THE PLURALITY OF WORKLOAD GROUPS │  │
│  │ FOR RECOVERY ~1602                              1600    │  │
│  │      THE SELECTING THE WORKLOAD GROUP FOR RECOVERY IS BASED ON A │  │
│  │      PRIORITY OF THE WORKLOAD GROUP ~1604              │  │
│  │ PERFORMING ONE OR MORE RECOVERY ACTIONS FOR THE WORKLOAD GROUP │  │
│  │ SELECTED FOR RECOVERY ~1606                             │  │
│  └─────────────────────────────────────────────────────────┘  │
│                                                               │
│  ┌─────────────────────────────────────────────────────────┐  │
│  │ THE WORKLOAD GROUP INCLUDES ONE OR MORE DATABASE OBJECTS OF THE │  │
│  │ DATABASE WORKLOAD ~1608                                 │  │
│  └─────────────────────────────────────────────────────────┘  │
│                                                               │
│  ┌─────────────────────────────────────────────────────────┐  │
│  │ THE DATABASE WORKLOAD INCLUDES A PLURALITY OF DATABASE OBJECTS │  │
│  │                                                         │  │
│  │ THE DIVIDING THE DATABASE WORKLOAD INCLUDES      1610   │  │
│  │      DETERMINING, BASED ON ONE OR MORE RULES AND ONE OR MORE │  │
│  │      ATTRIBUTES, A PLURALITY OF SERVICE CLASSES FOR THE DATABASE │  │
│  │      WORKLOAD ~1612                                     │  │
│  │      ASSIGNING THE PLURALITY OF DATABASE OBJECTS OF THE DATABASE │  │
│  │      WORKLOAD TO THE PLURALITY OF SERVICE CLASSES ~1614 │  │
│  │      THE ASSIGNING IS BASED ON ONE OR MORE PRIORITIES OF THE │  │
│  │      PLURALITY OF DATABASE OBJECTS AND A PLURALITY OF PRIORITIES OF │  │
│  │      THE PLURALITY OF SERVICE CLASSES ~1616            │  │
│  │      THE WORKLOAD GROUP SELECTED FOR RECOVERY INCLUDES ONE OR │  │
│  │      MORE DATABASE OBJECTS OF A SELECTED SERVICE CLASS ~1618 │  │
│  └─────────────────────────────────────────────────────────┘  │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 16A

PROVIDING A LOG DATA SET FOR THE WORKLOAD GROUP SELECTED FOR RECOVERY ~1630

THE LOG DATA SET IS ASSOCIATED WITH THE SELECTED SERVICE CLASS ⎤
    ⎥ 1632
    THE LOG DATA SET HAS A BOOTSTRAP DATA SET ASSOCIATED THEREWITH ~1634

PROVIDING A PLURALITY OF LOG DATA SETS FOR THE PLURALITY OF SERVICE CLASSES ~1636

THE PLURALITY OF SERVICE CLASSES INCLUDES THE PLURALITY OF WORKLOAD GROUPS ~1638

EACH LOG DATA SET OF THE PLURALITY OF LOG DATA SETS HAS A CORRESPONDING BOOTSTRAP DATA SET ~1640

THE PRIORITY OF THE WORKLOAD GROUP SELECTED FOR RECOVERY IS A HIGH PRIORITY RELATIVE TO OTHER PRIORITIES OF OTHER WORKLOAD GROUPS OF THE PLURALITY OF WORKLOAD GROUPS ~1642

THE PERFORMING ONE OR MORE RECOVERY ACTIONS INCLUDES RECOVERING ONE OR MORE LOG RECORDS OF A LOG DATA SET OF THE WORKLOAD GROUP SELECTED FOR RECOVERY ~1644

FIG. 16B

THE WORKLOAD GROUP SELECTED FOR RECOVERY IS AT LEAST A PART OF A RECOVERY GROUP OF A LOG DATA SET TO WHICH THE WORKLOAD GROUP IS ASSIGNED ~1650

THE RECOVERY GROUP INCLUDES DATABASE OBJECTS OF THE LOG DATA SET ~1652

THE DATABASE OBJECTS INCLUDE ONE OR MORE DATABASE OBJECTS OF THE WORKLOAD GROUP SELECTED FOR RECOVERY ~1654

AT LEAST MULTIPLE WORKLOAD GROUPS OF THE PLURALITY OF WORKLOAD GROUPS ARE ASSIGNED TO MULTIPLE LOG DATA SETS ~1656

THE MULTIPLE LOG DATA SETS INCLUDE MULTIPLE RECOVERY GROUPS ~1658

THE MULTIPLE RECOVERY GROUPS HAVE MULTIPLE PRIORITIES ASSOCIATED THEREWITH ~1660

CHANGING A PRIORITY OF A CHOSEN RECOVERY GROUP OF THE MULTIPLE RECOVERY GROUPS TO ADJUST A START OF RECOVERY FOR ONE OR MORE WORKLOAD GROUPS THAT ARE A PART OF THE CHOSEN RECOVERY GROUP 1662

THE CHANGING THE PRIORITY IS BASED ON AT LEAST RESOURCE USAGE OF THE COMPUTING ENVIRONMENT ~1664

FIG. 16C

DATABASE RECOVERY BASED ON WORKLOAD PRIORITIES

BACKGROUND

One or more aspects relate, in general, to facilitating processing within a computing environment, and in particular, to facilitating recovery processing associated with database systems of the computing environment.

A database system typically includes one or more databases and at least one database management system. A database is an organized collection of data electronically stored and accessed, and a database management system is a mechanism used to interact with one or more databases, as well as users and applications that use the one or more databases. The database management system provides various functions to manage the databases including an update function providing insertion, deletion and modification of the data maintained in the databases; retrieval of the data in the databases; administration of the databases including providing data security, data integrity, performance monitoring, etc.; and definition of the organization of the data.

Should a failure of a database or the database system occur, database recovery is performed. Database recovery includes restoring the database and data to a consistent state. Recovery takes time, and as the size of a database increases, so does the time it takes for recovery.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes dividing a database workload into a plurality of workload groups. A workload group of the plurality of workload groups is selected for recovery. The selecting of the workload group for recovery is based on a priority of the workload group. One or more recovery actions are performed for the workload group selected for recovery.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 16A-16C depict aspects of one embodiment of facilitating processing within a computing environment, in accordance with one or more aspects of the present invention;

DETAILED DESCRIPTION

In accordance with one or more aspects, a capability is provided to improve the efficiency in recovering databases. In one aspect, the capability includes dividing a database workload, which includes a plurality of database objects, into multiple workload groups, and performing recovery based on priorities of the workload groups. As an example, one or more workload groups with a high priority are recovered first, followed by other workload groups with lower priorities relative to the one or more workload groups with a high priority. In one example, the one or more workload groups with a high priority are recovered first, followed by one or more workload groups with a medium priority, followed by one or more workload groups with a low priority. In another example, one or more of the workload groups are concurrently recovered, in which recovery for at least one workload group commences prior to completion of recovery of another group. Other possibilities exist.

By first recovering (or at least initiating recovery of) a portion of a workload that has a higher priority relative to priorities of other workload portions, higher priority work (as defined, e.g., by a user) can be recovered and resumed quicker.

Figure 1A:
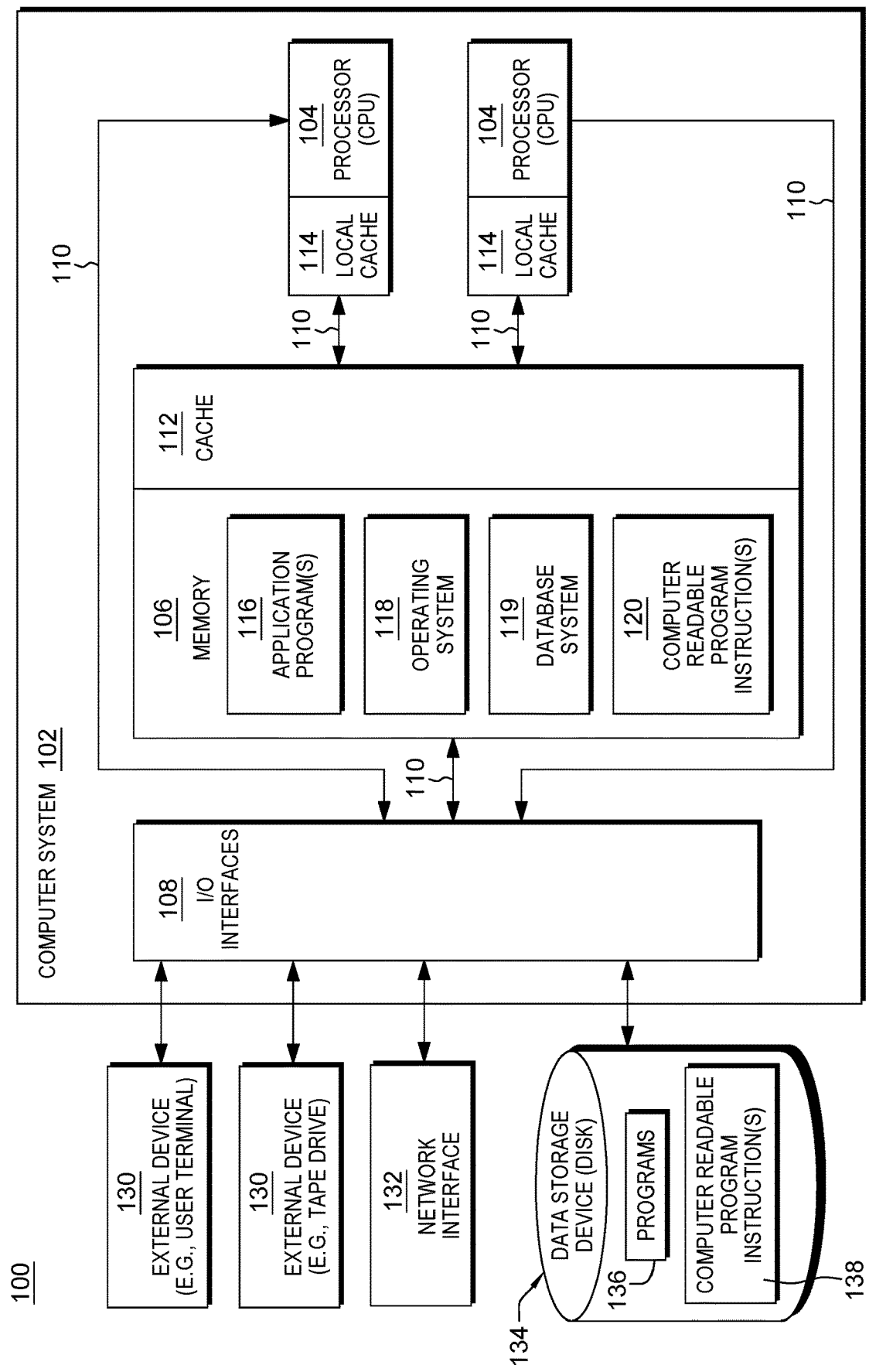
FIG. 1A depicts one example of a computing environment in which to incorporate and use one or more aspects of the present invention.

One example of a computing environment in which to include and/or use one or more aspects of the present invention is described with reference to FIG. 1A. As depicted in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104. Further, memory 106 may include one or more programs or applications 116, an operating system 118, a database system 119, and one or more computer readable program instructions 120. Computer readable program instructions 120 may be configured to carry out functions of embodiments of aspects of the invention.

Computer system 102 may also communicate via, e.g., I/O interfaces 108 with one or more external devices 130 and a network interface 132. External devices 130 include, for example, a user terminal, a tape drive, a pointing device, a display, etc., as well as one or more data storage devices 134 (e.g., storage, such as disk, etc.). Data storage device 134 may store one or more programs 136, one or more computer readable program instructions 138, and/or data (e.g., modified pages written to storage, log data written to storage, etc.), etc. The computer readable program instructions may be configured to carry out functions of embodiments of aspects of the invention.

Network interface 132 enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, database system 119 includes a database management system and one or more databases. One example of a database management system is a Db2® database management system offered by International Business Machines Corporation, Armonk, N.Y. Db2® is a trademark or registered trademark of International Business Machines Corporation in at least one jurisdiction. As an example, database system 119 employs one or more components to perform one or more aspects of the present invention. These components may be stored in memory, including main memory (e.g., memory 106) and/or one or more caches (e.g., cache 112, local cache 114) and/or external storage (e.g., device 134), and may be executed by one or more processors (e.g., processor 104).

Figure 1B:
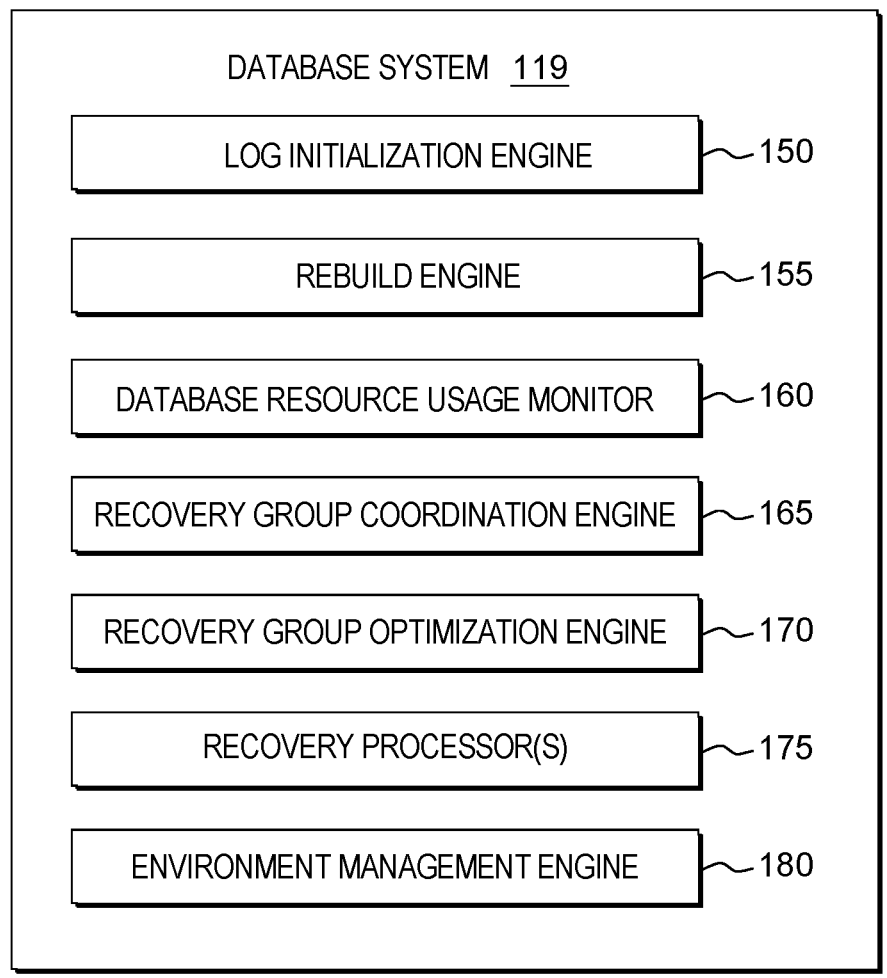
FIG. 1B depicts one example of components of a database system of the computing environment of FIG. 1A to be used to perform one or more aspects of the present invention.

In one example, referring to FIG. 1B, the components include, for instance:

Log initialization engine 150 used, e.g., to distribute database objects among a plurality of log data sets, in accordance with one or more aspects of the present invention;

Rebuild engine 155 used, e.g., to prepare for recovery of one or more database objects, in accordance with one or more aspects of the present invention;

Database resource usage monitor 160 used, e.g., to monitor resource usage for recovery, in accordance with one or more aspects of the present invention;

Recovery group coordination engine 165 used, e.g., to schedule one or more recovery processors (e.g., recovery processor(s) 175), in accordance with one or more aspects of the present invention;

Recovery group optimization engine 170 used, e.g., to create a recovery plan which is provided to recovery group coordination engine 165, in accordance with one or more aspects of the present invention;

Recovery processor(s) 175 used, e.g., in performing recovery, in accordance with one or more aspects of the present invention; and Environment management engine 180 used, e.g., to save a state of recovery and/or to restore the state of recovery, in accordance with one or more aspects of the present invention.

Although various components are described, aspects of the invention may be performed by one or more of the components. There may be additional, fewer and/or different components used to perform one or more aspects of the present invention. Many variations are possible.

Figure 2:
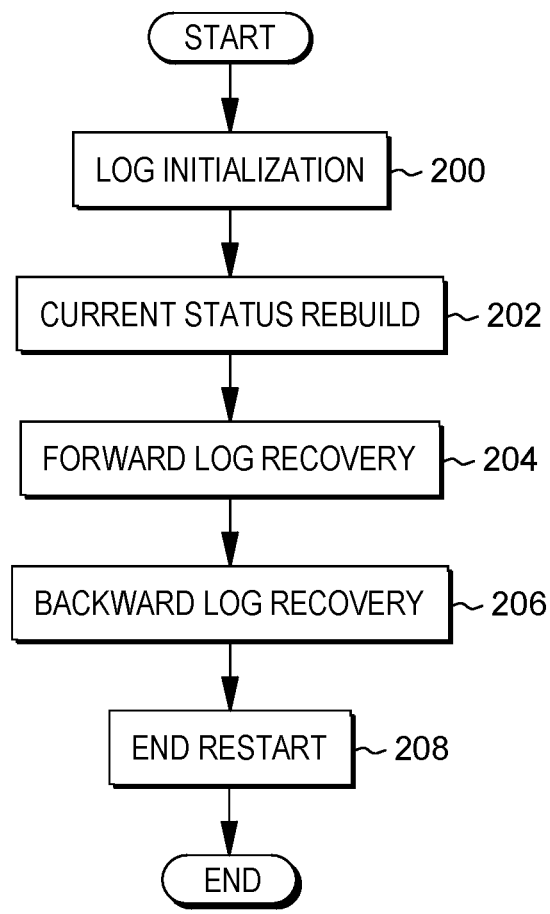
FIG. 2 depicts one example of an overview of a database recovery process, in accordance with one or more aspects of the present invention.

One embodiment of an overview of a process for performing aspects of database recovery is described with reference to FIG. 2. In accordance with an aspect of the present invention, log initialization is performed (200) to distribute workload groups of a database workload among a plurality of log data sets. For instance, database objects (e.g., tables, indexes, pages, etc.) of a database are distributed among a plurality of log data sets. In one example, the distribution is based on priorities of the database workload, and in particular, based on priorities of the database objects. One embodiment of log initialization is described with reference to FIGS. 3-6. In one example, log initialization is performed using, e.g., log initialization engine 150.

Figure 3:
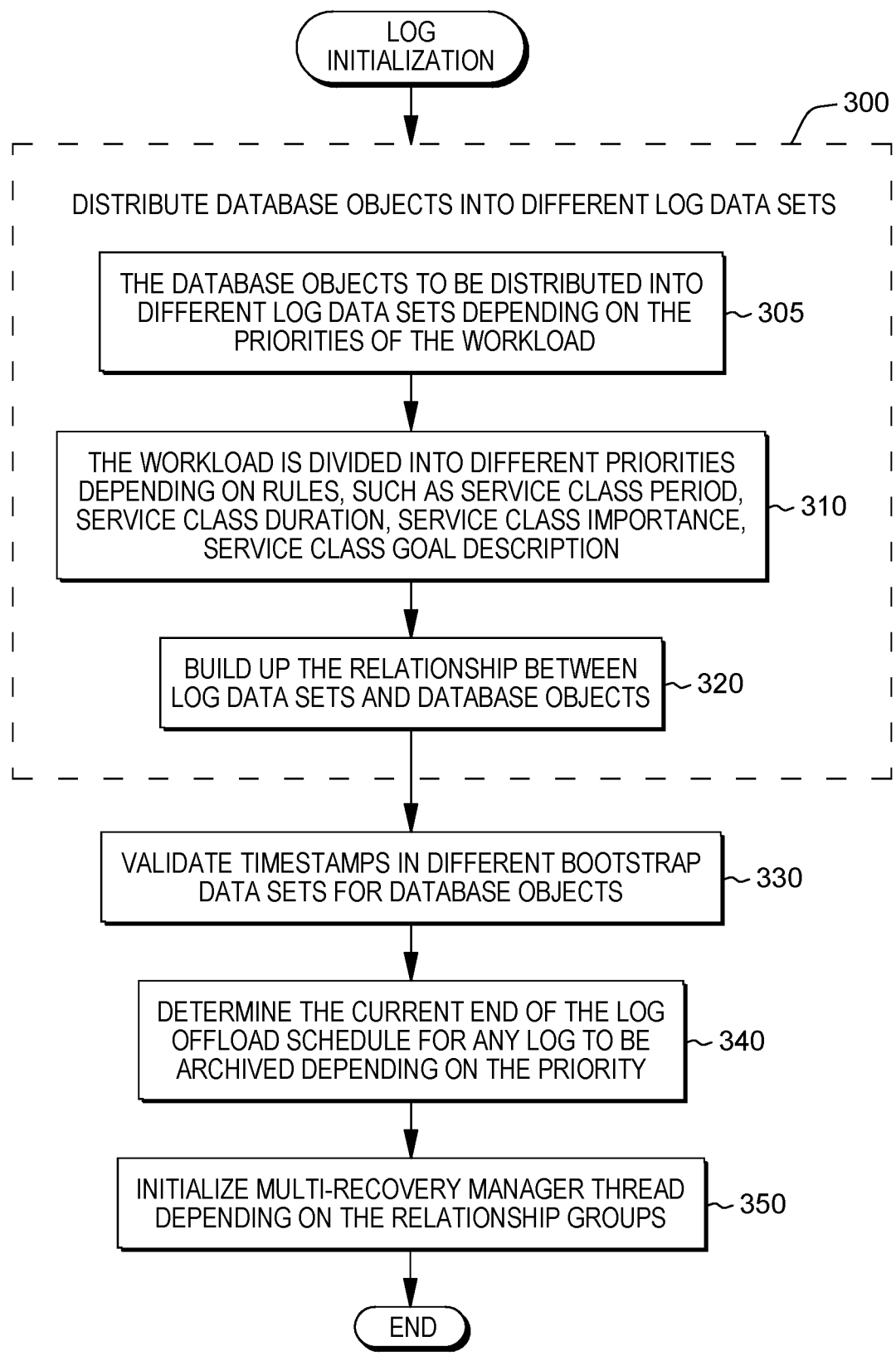
FIG. 3 depicts one example of a log initialization process, in accordance with one or more aspects of the present invention.

Referring initially to FIG. 3, in one example, log initialization includes distributing database objects (e.g., tables, indexes, pages, etc.) of a database among different log data sets (300). Typically, with reference to FIG. 4A, database objects of a particular database are stored in a database log (also referred to as a log) 400 that is contained within a single log data set 402. Further, information regarding log data set 402 is included in a bootstrap data set (BSDS) 404. In one example, bootstrap data set 404 is a VSAM (virtual storage access method) key-sequenced data set, which includes information (e.g., names of the logs) that is used by a database management system. The database management system uses information in the bootstrap data set for various functions, such as system restarts and for any activity that requires reading a log.

A database log, such as log 400, registers data changes and significant events as they occur in the database system. For example, a database management system of the database system, such as a Db2 ® database management system, takes periodic checkpoints 406 during normal operation in order to reduce restart time after, e.g., a failure. As examples, the database management system takes checkpoints when a predefined number of log records have been written or a predetermined amount of time in, e.g., minutes has elapsed; when switching from one active log data set to another; at the end of a successful restart; and at normal termination. At a checkpoint, the database management system logs its current status and registers a log relative byte address (RBA) 408 of the checkpoint in a bootstrap data set, such as bootstrap data set 404. At restart, the database management system uses the information in the checkpoint records to reconstruct its state when it terminated.

Figure 4A:
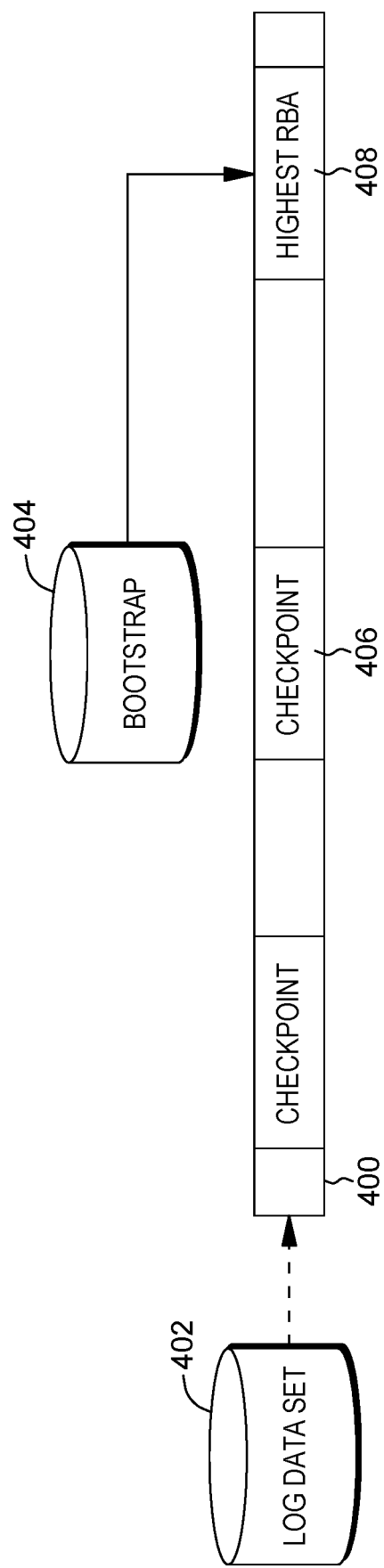
FIG. 4A depicts one example of using a log dataset, in accordance with one or more aspects of the present invention.
Figure 4B:
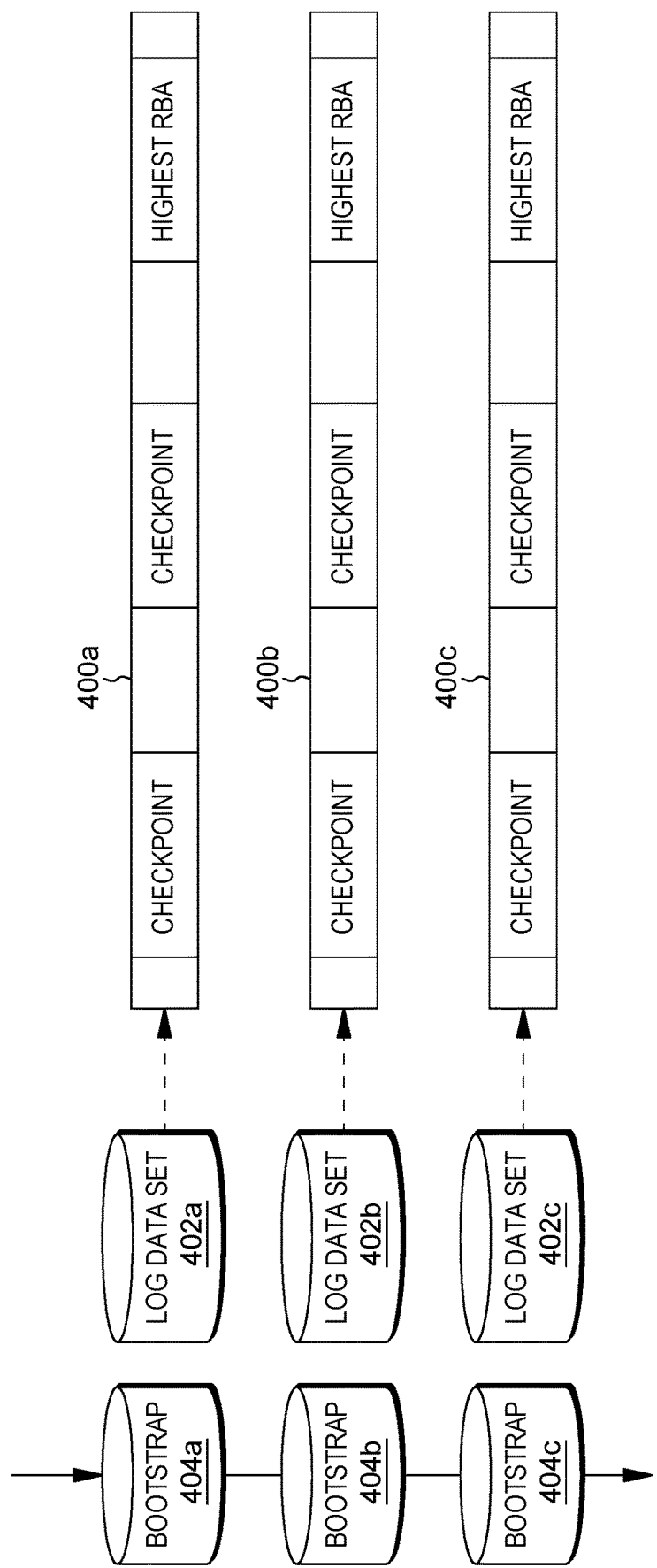
FIG. 4B depicts one example of using multiple log datasets, in accordance with one or more aspects of the present invention.

Returning to FIG. 3, in accordance with an aspect of the present invention, the database objects of the database are distributed into different log data sets depending, for instance, on the priorities (e.g., high, medium, low) of the workload (305). As shown in FIG. 4B, instead of a single log data set (e.g., log data set 402 of FIG. 4A), multiple log data sets, such as log data sets 402a-402c, are used. Each log data set 402a-402c includes a log 400a-400c for selected database objects of a database, and each log data set 402a-402c has a bootstrap data set 404a-404c associated therewith. The database objects of a log data set are of, e.g., a same priority, in one example. For instance, log data set 402a includes database objects of a high priority, log data set 402b includes database objects of a medium priority, and log data set 402c includes database objects of a low priority. Other examples exist. For instance, the priorities may be indicated in a manner other than high, medium, low. Also, there may be additional, fewer and/or different priorities. In a further example, a log data set may include database objects of varying priorities; however, at least one log data set includes only database objects of a particular priority, such as a high priority. Many variations are possible.

In one example, returning to FIG. 3, the workload is divided into different priorities based on prespecified rules, such as a service class period, service class duration, service class importance and/or a service class goal description (310) provided by, e.g., a user. In other examples, additional, fewer and/or other rules may be used. These rules are referred to herein as classification rules, and an example of using the classification rules is described with reference to FIGS. 5A-5C.

Figure 5A:
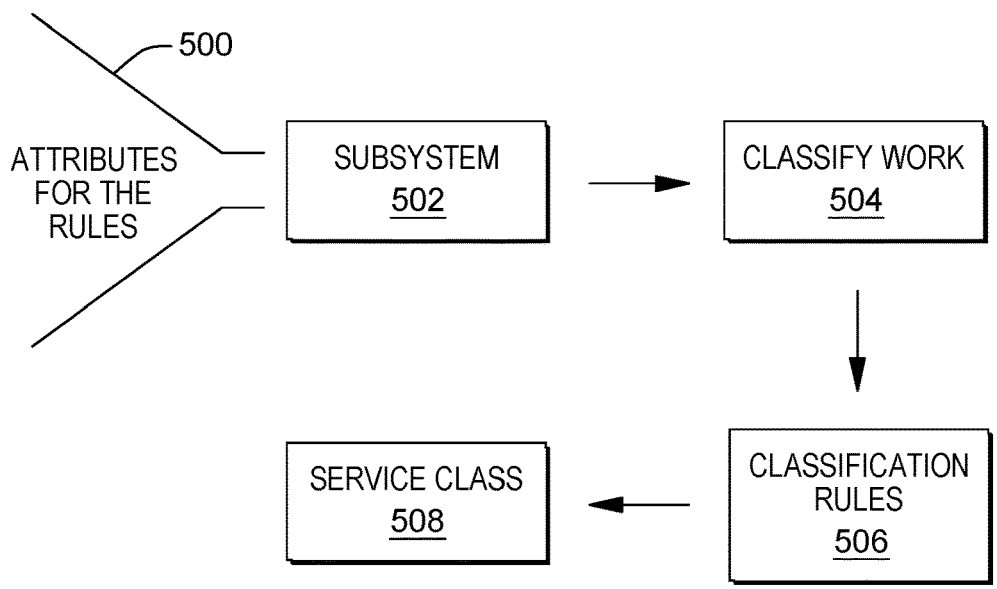
FIG. 5A depicts one example of determining service classes for a database workload, in accordance with one or more aspects of the present invention.

Referring to FIG. 5A, one or more attributes 500 for the rules are input to a database subsystem 502 (e.g., a Db2® subsystem). Example attributes include accounting information, collection name, connection type, correlation information, logical unit (LU) name, net id, package name, plan name, priority, procedure name, process name, scheduling environment, subsystem collection name, subsystem instance, subsystem parameter, sysplex name, system name, transaction class/job class, transaction name/job name and/or user id. Additional, fewer and/or other attributes may be used. The attributes are input into a classify work process 504 that uses one or more classification rules 506 to determine one or more service classes 508 for the workload. In one example, the classification rules include service class period, service class duration, service class importance and/or service class goal description. Additional, fewer and/or other rules may be used. Based on the input and rules, service classes of different priorities are provided and used in dividing a database workload based on priorities. A service class provides logical groupings for the workload and defines, for instance, an execution environment in which work can run. This execution environment allocates available resources and can include thresholds that determine how work is permitted to run.

Figure 5B:
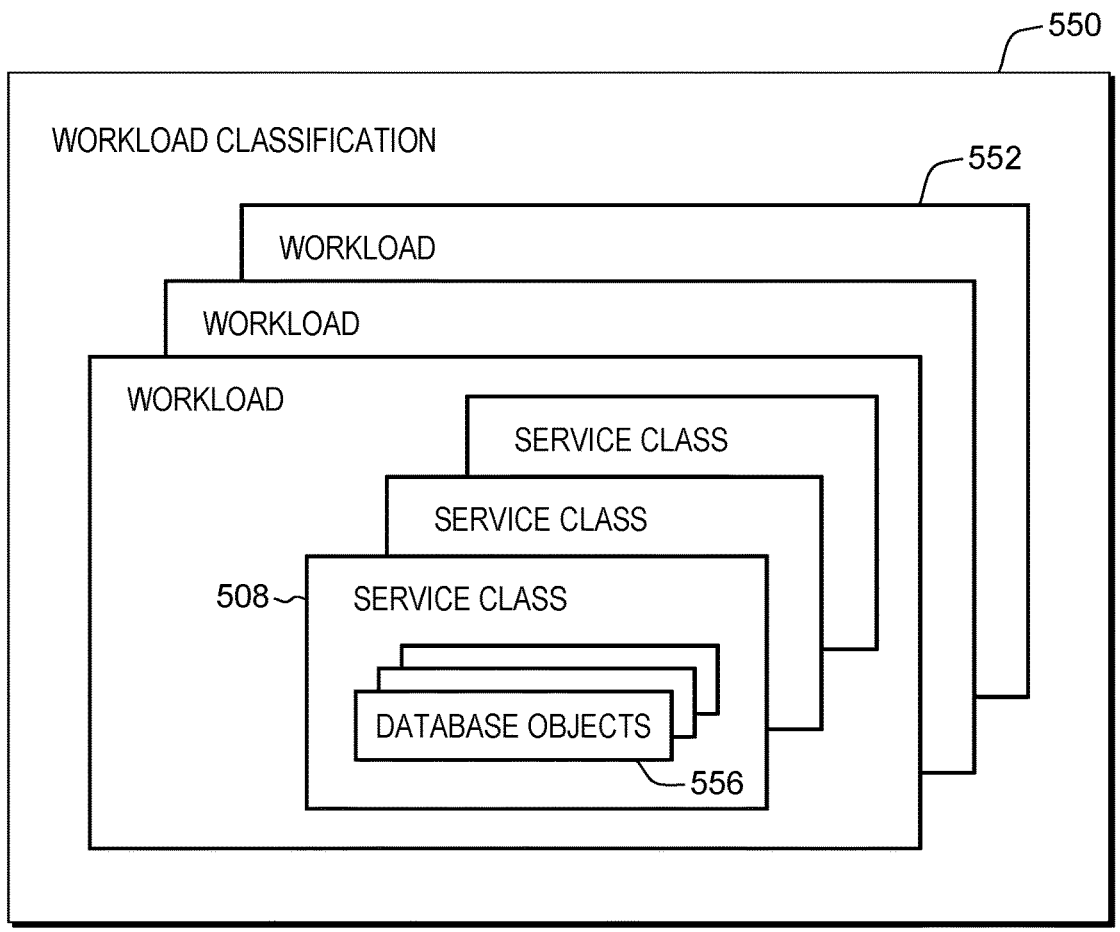
FIG. 5B depicts one example of a workload classification including database workloads and service classes for a database workload, in accordance with one or more aspects of the present invention.

As depicted in FIG. 5B, in accordance with one or more aspects of the present invention, a workload classification 550 includes, for instance, one or more workloads 552 (also referred to as database workloads), and a workload 552 is divided into a plurality of service classes 508. For instance, database objects of a workload 522 are assigned to a plurality of service classes 508, such that a service class 508 includes one or more database objects 556 of a database. In one example, database objects 556 of a database workload are classified into different service classes depending on the rules, and each service class has a priority associated therewith, such as high, medium, or low. Additional, fewer and/or other priorities may be used in other embodiments. The database objects of a service class represent one or more workload groups of the workload, in which the workload is divided into the workload groups based on priorities of the workload. Although an example of defining service classes and dividing a workload based on priorities is described, other techniques for defining service classes and/or dividing workloads based on priorities may be used.

Figure 5C:
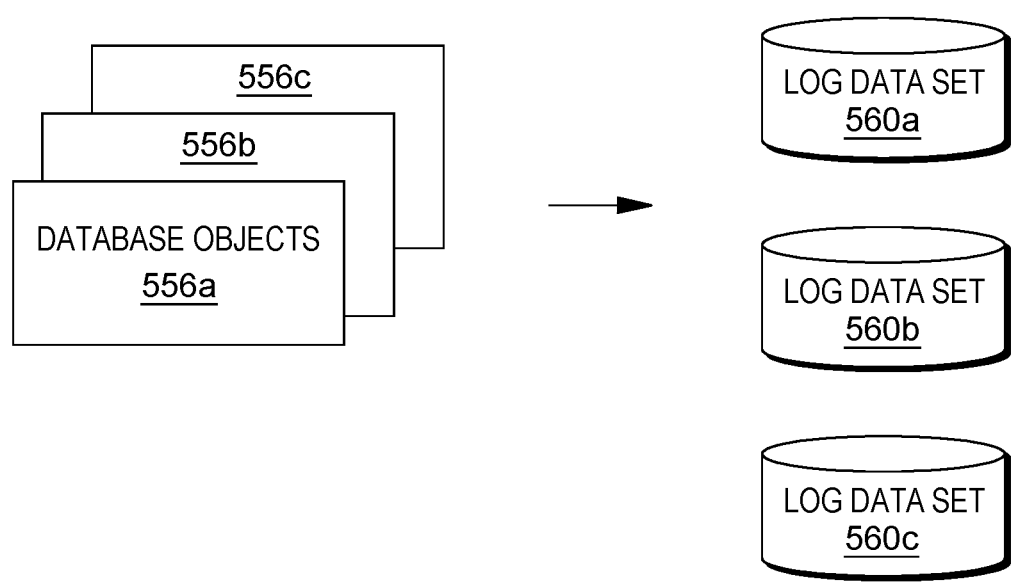
FIG. 5C depicts one example of distributing database objects of the determined service classes to a plurality of log data sets, in accordance with one or more aspects of the present invention.
Figure 6:
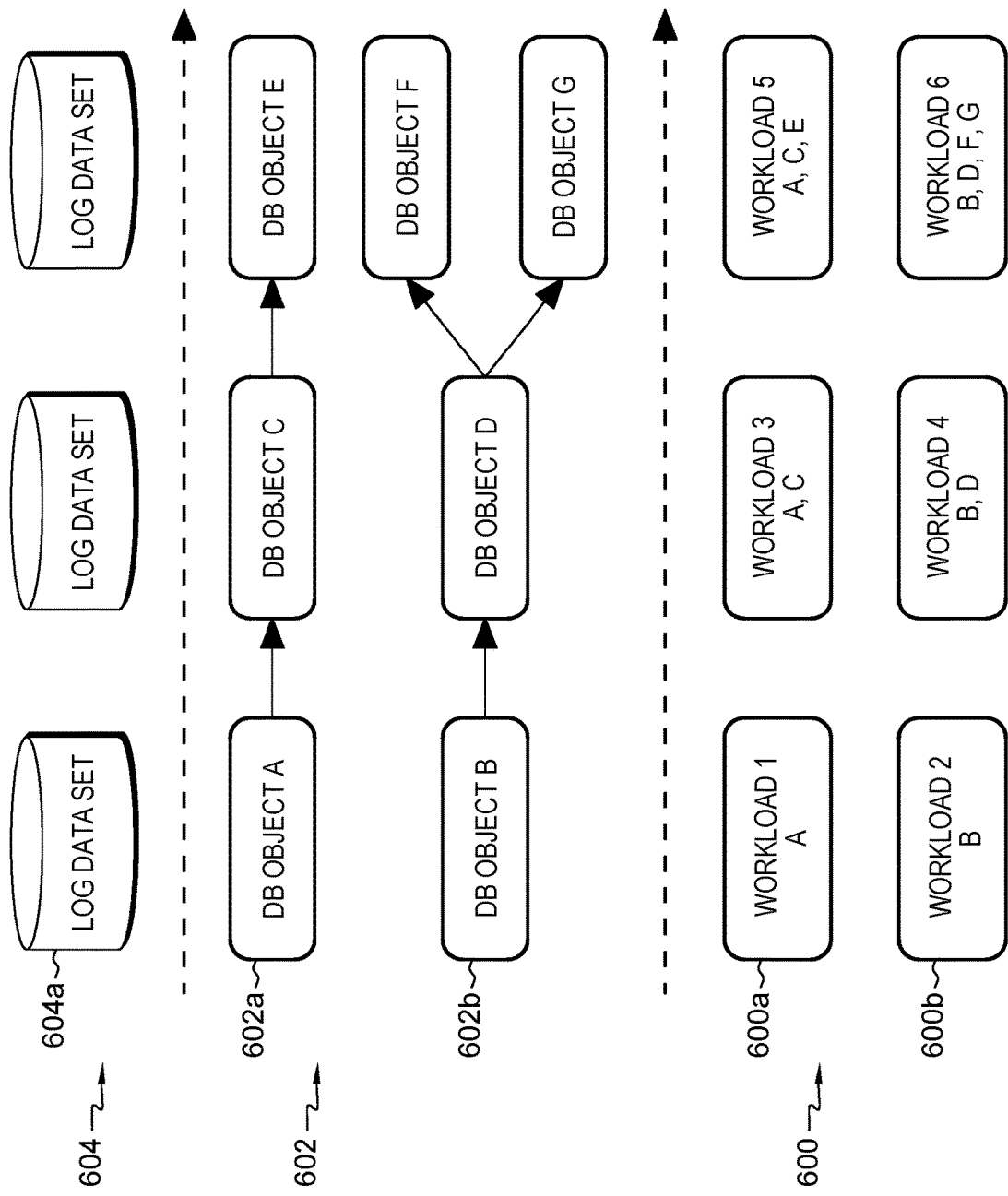
FIG. 6 depicts one example of various workloads and recovery groups, in accordance with one or more aspects of the present invention.

Returning to FIG. 3, the relationship between the database objects and the log data sets is defined (320). For instance, in accordance with an aspect of the present invention, database objects in a same service class are assigned to a same log data set. As depicted in FIG. 5C, database objects 556a are assigned to one of the log data sets (e.g., log data set 560a), and another set of database objects 556b is assigned to another one of the log data sets (e.g., log data set 560b), etc. The log data set used for a set of database objects is the log data set used to recover the database objects, and that log data set has a bootstrap data set associated therewith. Therefore, in one example, to ensure that the correct log data set is associated with the correct set of database objects, a catalog name in a bootstrap data set is compared with a catalog parameter of the database objects of the data set associated with that bootstrap data set.

Returning to FIG. 3, timestamps in the different bootstrap data sets for different database objects are validated for recovery purposes (330). For instance, a database object being recovered is able to be recovered back to the last checkpoint timestamp in the log data set for that database object.

A determination is made of a current end of a log offload schedule for any logs that are to be archived, based on priority (340). As an example, the logs with the highest priority relative to other logs are archived first since recovery is based on priority. The log data set with the highest priority relative to other log data sets is read first, in one embodiment.

A multi-recovery manager thread is initialized based on relationship groups that have been defined (350) and is used, in one example, to monitor and/or manage use of system resources associated with the relationship groups. In one example, with reference to FIG. 6, a relationship group includes, for instance, one or more workloads 600 and one or more database objects 602 of those workloads that are used together. One particular relationship group includes, e.g., Workload 1 (600a), Workload 2 (600b), DB Object A (602a) and DB Object B (602b). A relationship group is used to define a recovery group. For instance, database objects of a relationship group and its associated log data set define a recovery group. One particular recovery group includes database objects 602a, 602b and log data set 604a. In one example, a recovery group includes, e.g., all the database objects of a log data set. A log data set, such as log data set 604a, is used in recovery of database objects 602a, 602b.

Returning to FIG. 2, in addition to log initialization, a current status rebuild is performed to prepare for recovery (202). An example of this processing is described with reference to FIG. 7. In one example, status rebuild processing is performed using, e.g., rebuild engine 155.

Figure 7:
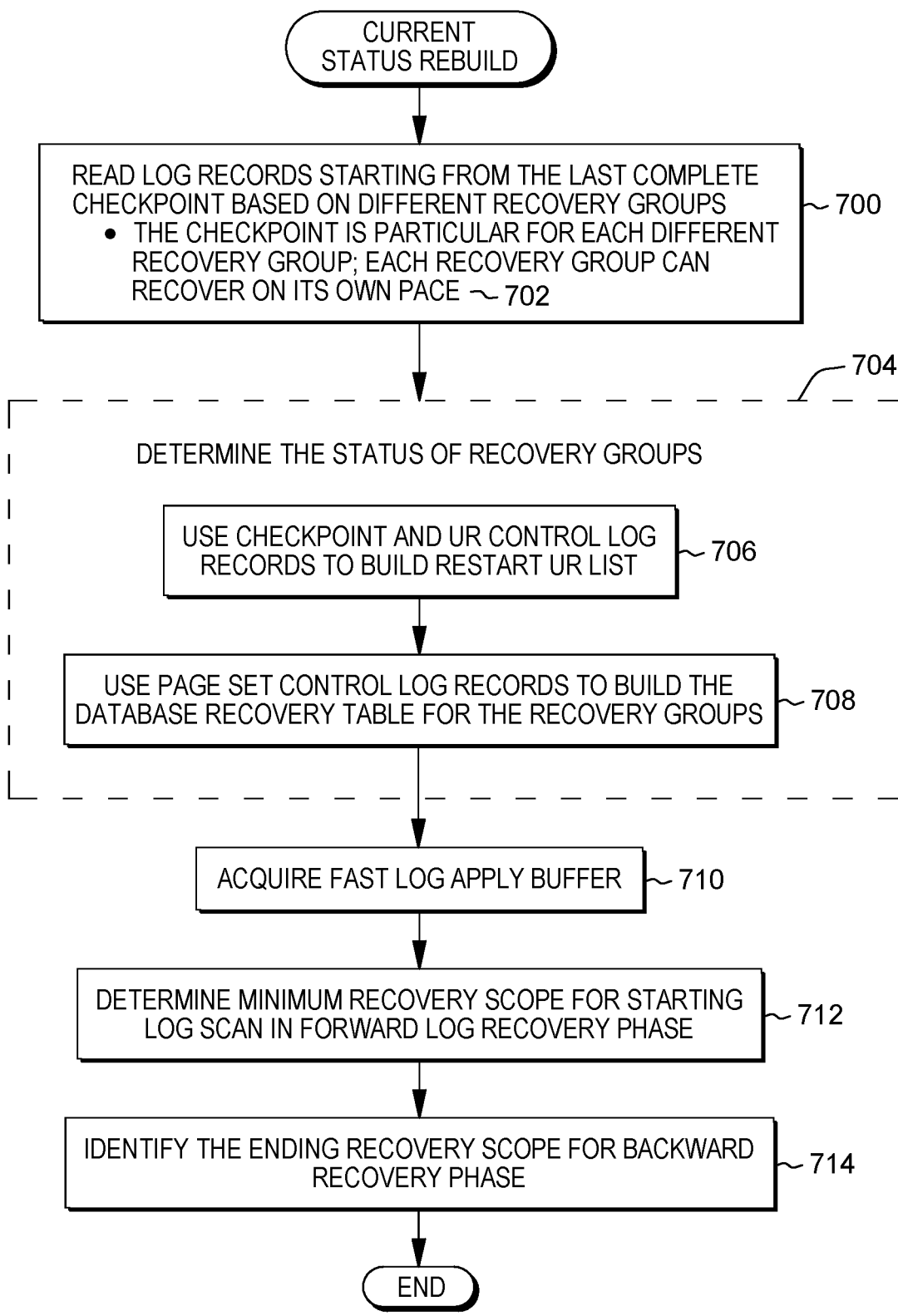
FIG. 7 depicts one example of a current status rebuild process, in accordance with one or more aspects of the present invention.

Referring to FIG. 7, initially, for each recovery group (e.g., the database objects in a log data set), the log records of a log data set assigned to that recovery group are read starting from the last complete checkpoint of the log (700). A checkpoint is particular for each different recovery group, such that a recovery group can recover on its own pace (702). As an example, the log records of a recovery group with a higher priority than other recovery groups are read first.

A determination is made of the status of the recovery groups (704). In one example, the status of a recovery group is determined based on the status of units of recovery (URs) of the recovery group. A unit of recovery includes, for instance, operations performed from one commit point of a transaction or program to another commit point of the transaction or program. In one example, to determine the status of the units of recovery, checkpoint log records, UR control log records and page set control log records of a log corresponding to the recovery group are used. For instance, in one example, a log includes information to be used in recovery and may include various types of log records, including, e.g., UR control log records, checkpoints, and page set control records. The UR control log records describe, for instance, changes to the database, which are made within units of recovery. The page set control records register allocations, opening and/or closing of page sets, such as table spaces or index spaces, as examples. A table space is, for instance, a set of volumes on one or more disks that hold data sets in which tables are stored. A table space includes a number of data sets (e.g., VSAM linear data sets), and a table set is divided, for instance, into pages. A page set is, for instance, a data set (e.g., a VSAM linear data set) to store messages and object definitions.

In one example, the checkpoint and unit recovery control log records are used to build a restart unit recovery list (706) to be used in log recovery, and the page set control log records are used to build the database recovery table for the recovery group (708). The restart unit recovery list and/or the database recovery table are used in one or more aspects of recovery associated with a recovery group.

Further, in one embodiment, a log apply buffer is acquired (710) for use in recovery. For instance, log records are read from storage to the buffer and from the buffer to storage. Performance is improved by using a buffer that is considered fast.

A determination is made of a minimum recovery scope (e.g., relative byte address value) for starting a log scan in a forward log recovery phase (712); and an ending recovery scope (e.g., relative byte address value) for a backward log recovery phase (714). Forward and backward log recovery are described in further detail below.

Returning to FIG. 2, based on log initialization and current status rebuild, recovery, including log recovery, commences. In one embodiment, recovery includes forward log recovery (204), backward log recovery (206) and restart (also referred to as recovery) completion (208), each of which is described in further detail below. In one example recovery processing is performed using, e.g., one or more recovery processors 175.

Figure 8:
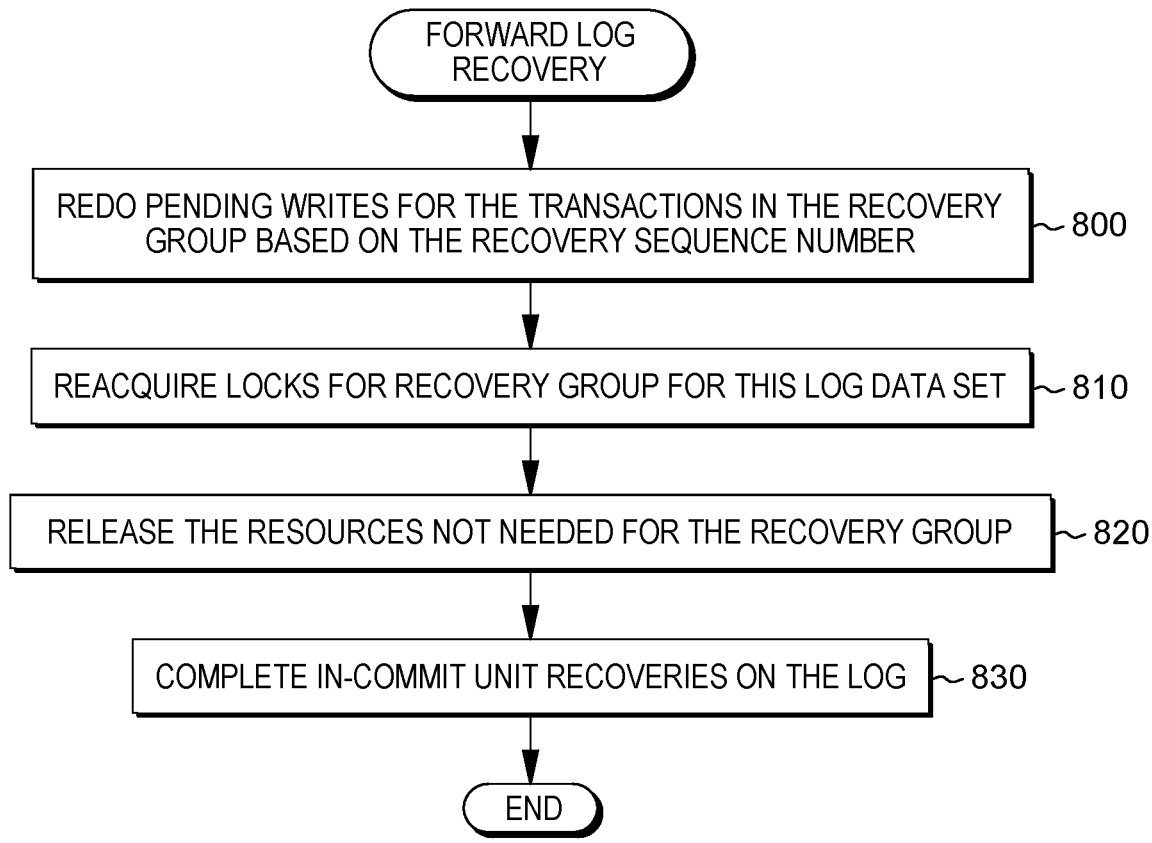
FIG. 8 depicts one example of aspects of a forward log recovery process, in accordance with one or more aspects of the present invention.
Figure 9:
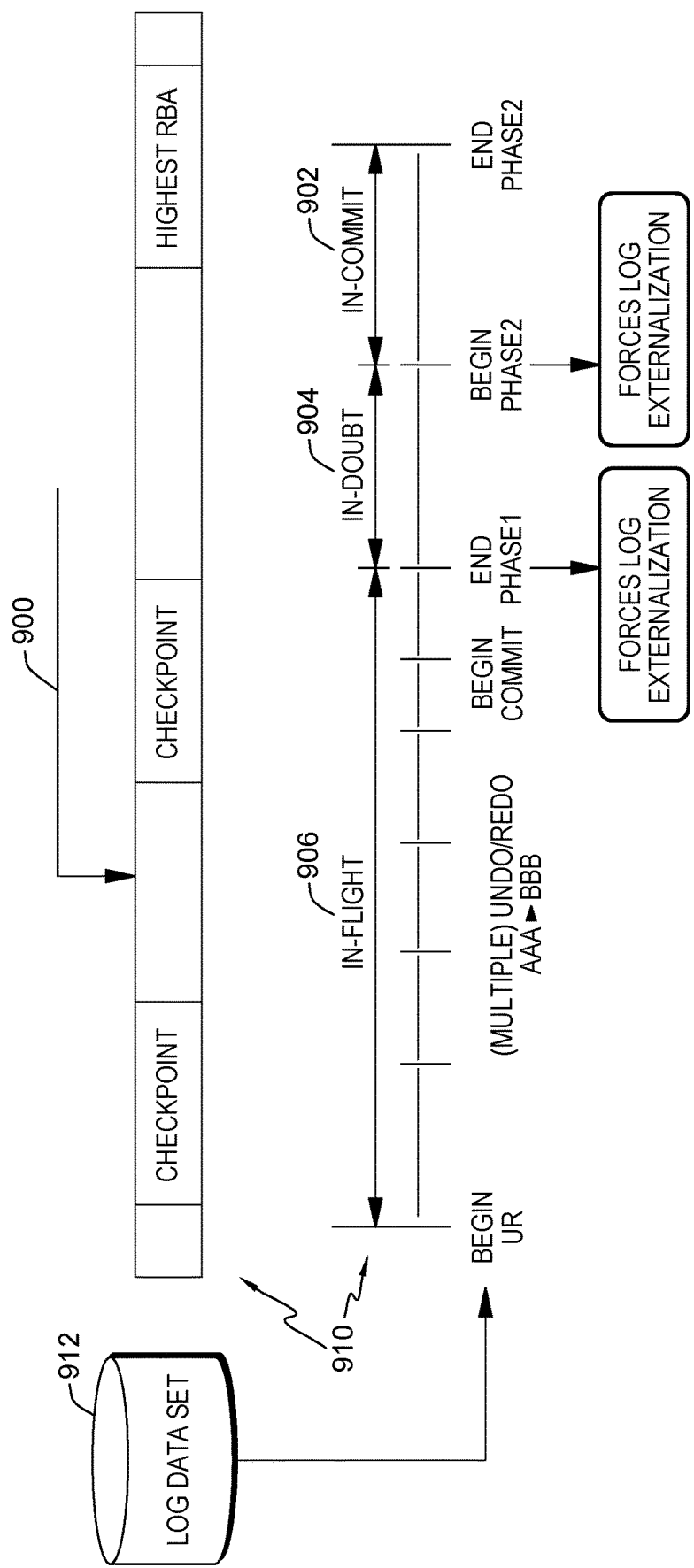
FIG. 9 depicts one example of forward log recovery, in accordance with one or more aspects of the present invention.

One embodiment of aspects of forward log recovery is described with reference to FIGS. 8-9. This processing is performed, e.g., for each recovery group. Referring initially to FIG. 8, a redo pending write is performed for the transactions in the recovery group based on, for instance, a recovery sequence number, such as a relative byte address (800). For instance, referring to FIG. 9, a redo operation 900 for pending writes is performed, based, e.g., on the restart unit recovery list for committed, in-commit 902, in-doubt 904, in-flight 906, in-abort and postponed-abort units of recovery of a log 910 of a log data set 912. The units of recovery in the different log sets (e.g., different priorities) are checked to determine whether a relative byte address of the log records has a predetermined relationship (e.g., greater than) with a last modification for this page (e.g., page log relative byte address in the page header). If the relative byte address has the predetermined relationship with the page log relative byte address, the redo operation is performed for that unit of recovery.

Returning to FIG. 8, in one embodiment, one or more locks for in-doubt units of recovery for the recovery group for this log data set are reacquired (810). Further, in one example, resources that are not needed (e.g., retained page p-locks) for the recovery group are released (820). Additionally, in one embodiment, in-commit units of recovery of the recovery group are completed (830).

Figure 10:
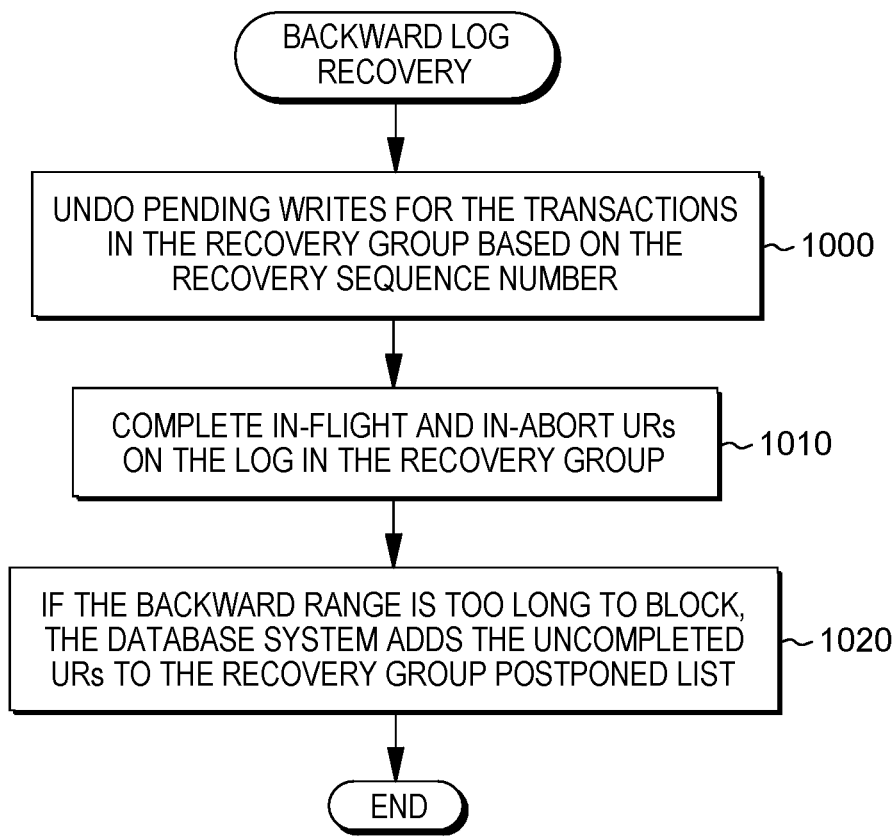
FIG. 10 depicts one example of aspects of a backward log recovery process, in accordance with one or more aspects of the present invention.
Figure 11:
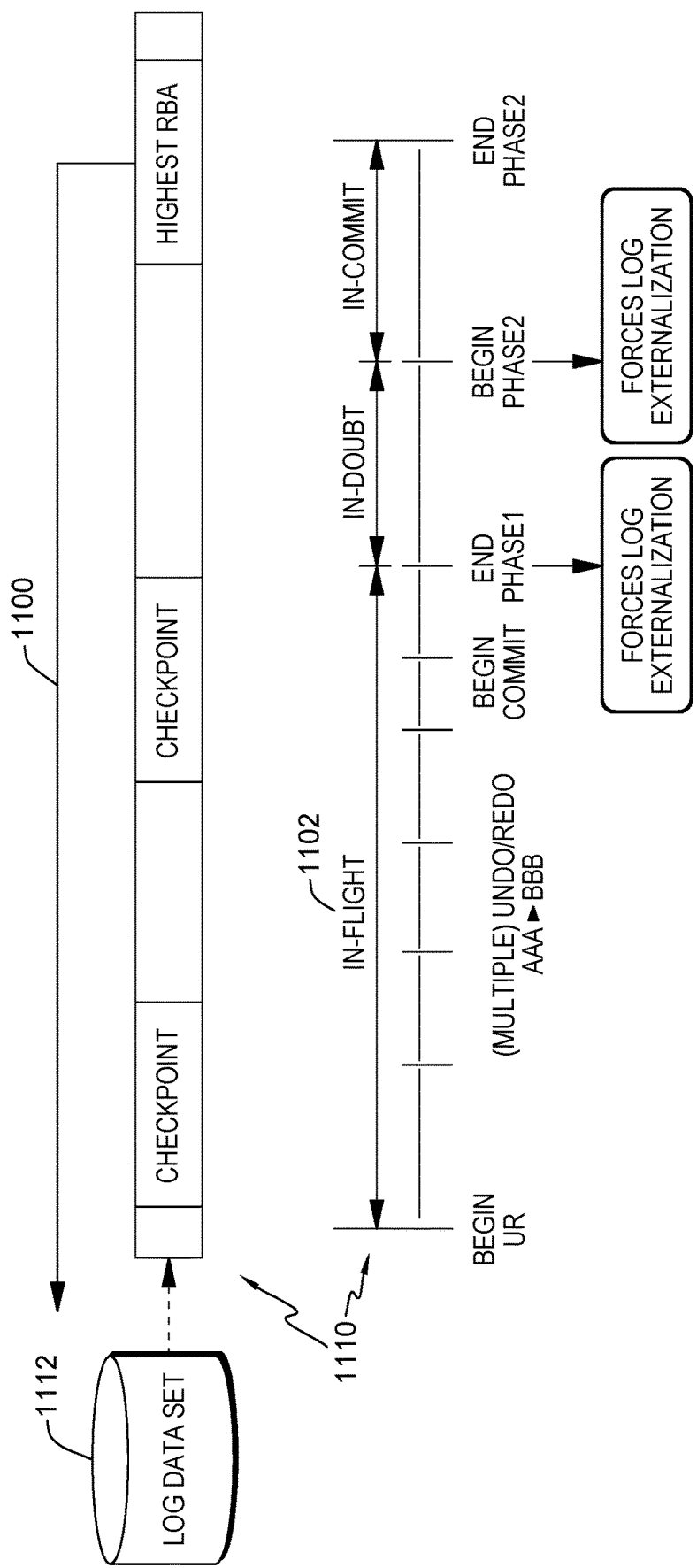
FIG. 11 depicts one example of backward log recovery, in accordance with one or more aspects of the present invention.

One embodiment of aspects of backward log recovery is described with reference to FIGS. 10-11. This processing is performed, e.g., for each recovery group. Referring initially to FIG. 10, undo pending writes are performed for the transactions in the recovery group based on, for instance, a recovery sequence number, such as a relative byte address (1000). For instance, referring to FIG. 11, an undo log records operation 1100 is applied based, e.g., on the restart unit recovery list for in-flight 1102 and in-abort units of recovery. For instance, a determination is made as to whether a last modification for this page (e.g., page log relative byte address) has a predetermined relationship (e.g., greater than or equal) with a relative byte address of the log records. If the last modification for the page has the predetermined relationship with the relative byte address, then the undo is applied. For example, a redo compensation log record is written for each undo log record, regardless of whether the undo log record is actually applied.

Further, in one embodiment, in-flight 1102 and in-abort units of recovery in the recovery group that are not converted to postponed are completed on a log 1110 of a log data set 1112 (1010 (FIG. 10)).

In one example, if the backward range is too long to block, the database system adds the uncompleted units of recovery to a postponed list to be corrected later (1020). For instance, the user determines the size of the log data set to be recovered. If there is more to be recovered than the size of the log data set, then the backward range is too long and uncompleted units of recovery are added to the postponed list.

Figure 12:
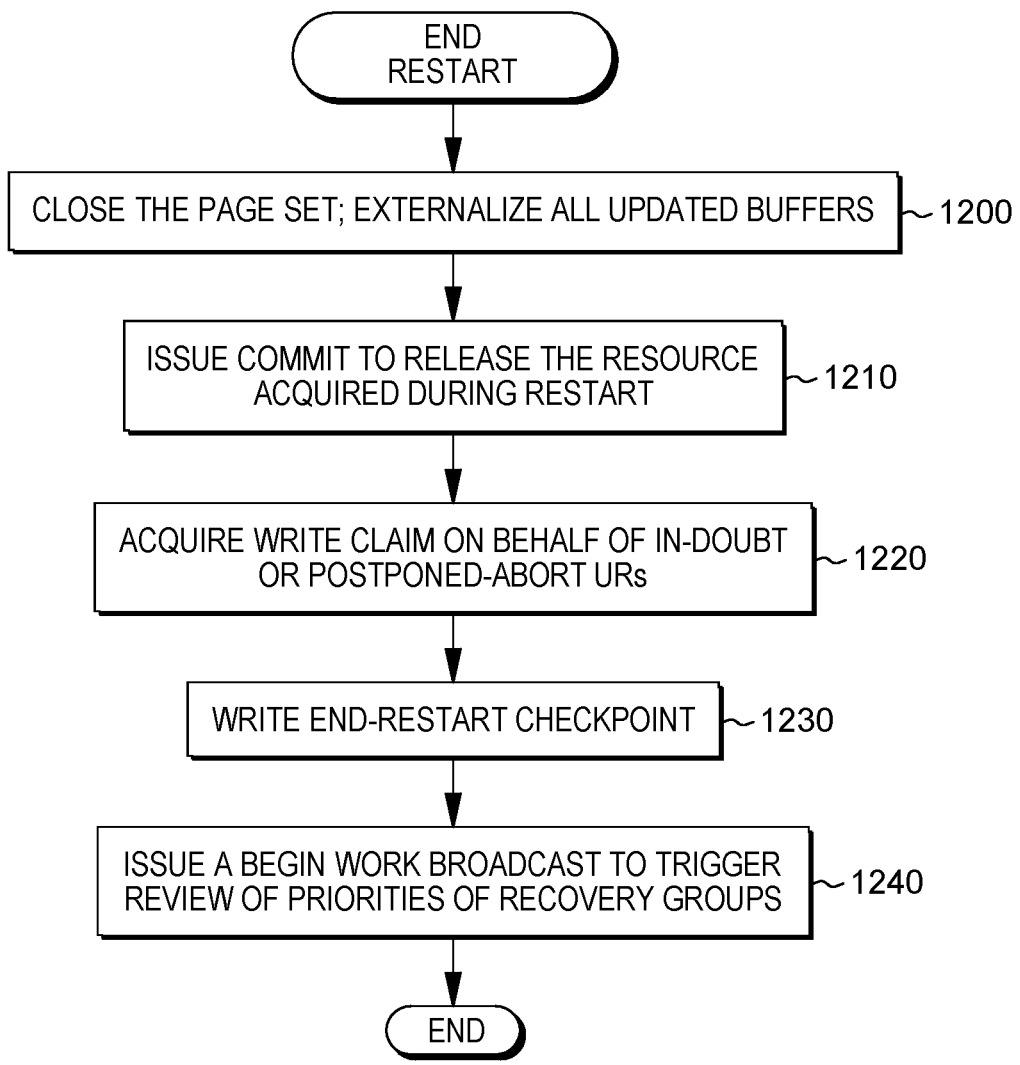
FIG. 12 depicts one example of an end restart process, in accordance with one or more aspects of the present invention.

Thereafter, restart (also referred to as recovery) is completed. For instance, as described with reference to FIG. 12, the page set is closed, and the updated buffers are externalized, such that they are visible (1200). A commit is issued to release one or more resources, such as one or more locks, acquired during the restart (1210). Further, a write claim on behalf of in-doubt or postponed-abort units of recovery is acquired (1220). A write claim indicates activity on or interest in a particular page set or partition to the database system. It allows reading, updating, inserting and deleting of the database. It is obtained, for instance, at first access of a database object and released on a next checkpoint.

Figure 13:
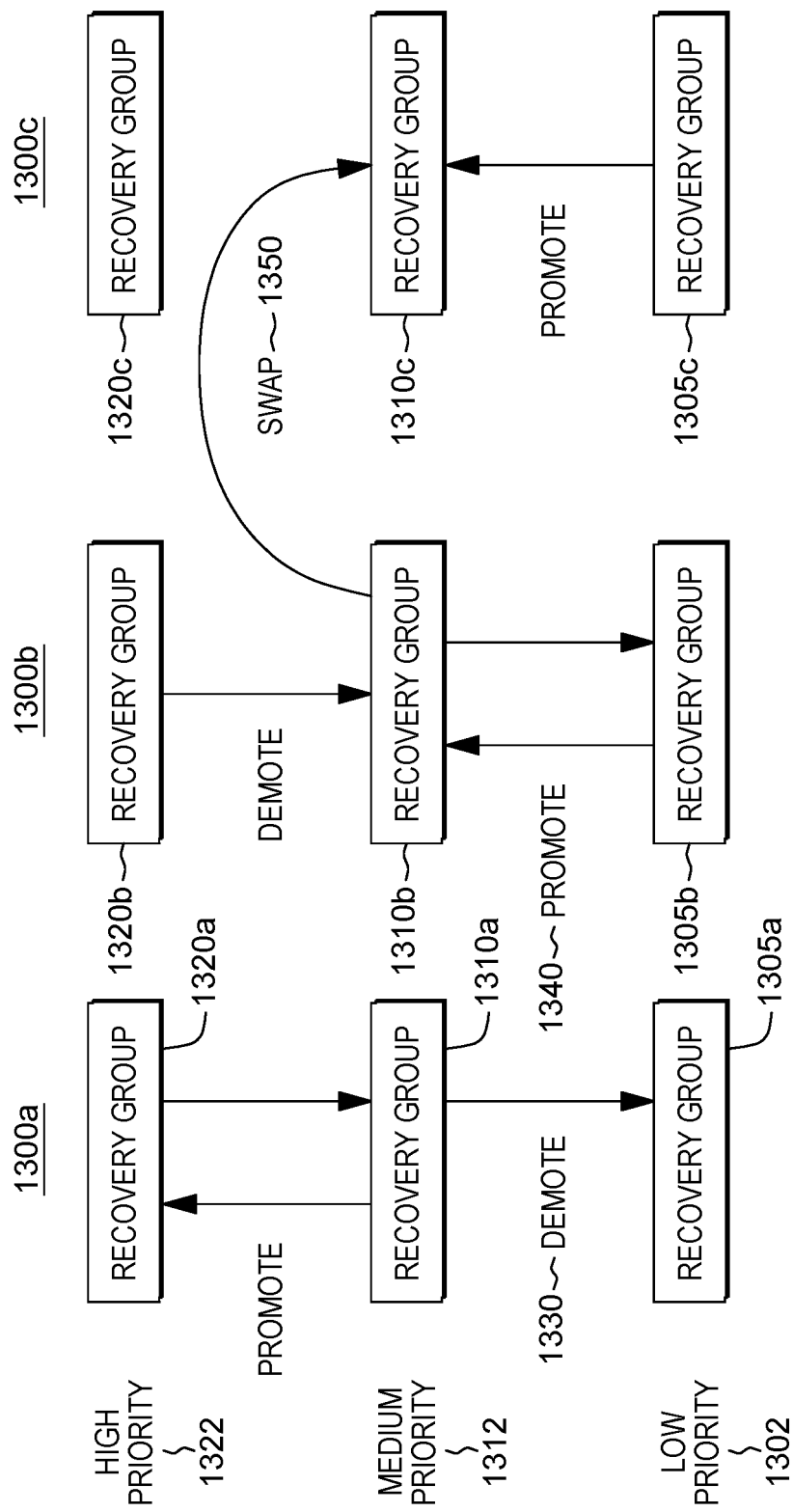
FIG. 13 depicts one example of recovery groups and priorities associated therewith, in accordance with one or more aspects of the present invention.

Additionally, an end-restart checkpoint is written (1230) to indicate an end of restart. Further, a begin work broadcast is issued to trigger, for instance, a review of priorities of the recovery groups (1240). For instance, as depicted in FIG. 13, each workload 1300a-1300c includes one or more recovery groups 1305a-1305c that initially have a low priority 1302; one or more recovery groups 1310a-1310c that initially have a medium priority 1312; and one or more recovery groups 1320a-1320c that initially have a high priority 1322. During processing and/or recovery, a priority of a recovery group of a workload may be demoted 1330 or promoted 1340, and/or it may be swapped 1350 with a recovery group of another workload, as examples. Other variations are also possible.

Figure 14:
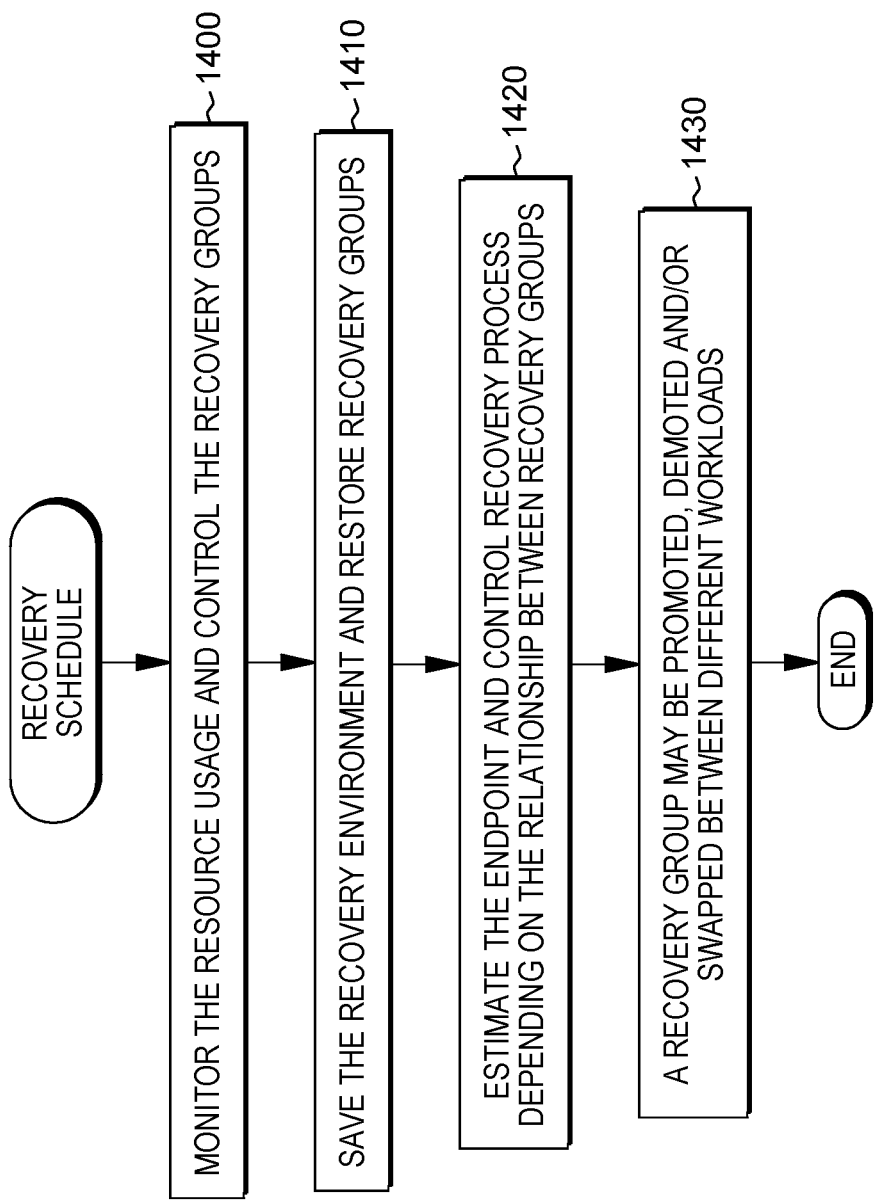
FIG. 14 depicts one example of a recovery schedule process, in accordance with one or more aspects of the present invention.
Figure 15:
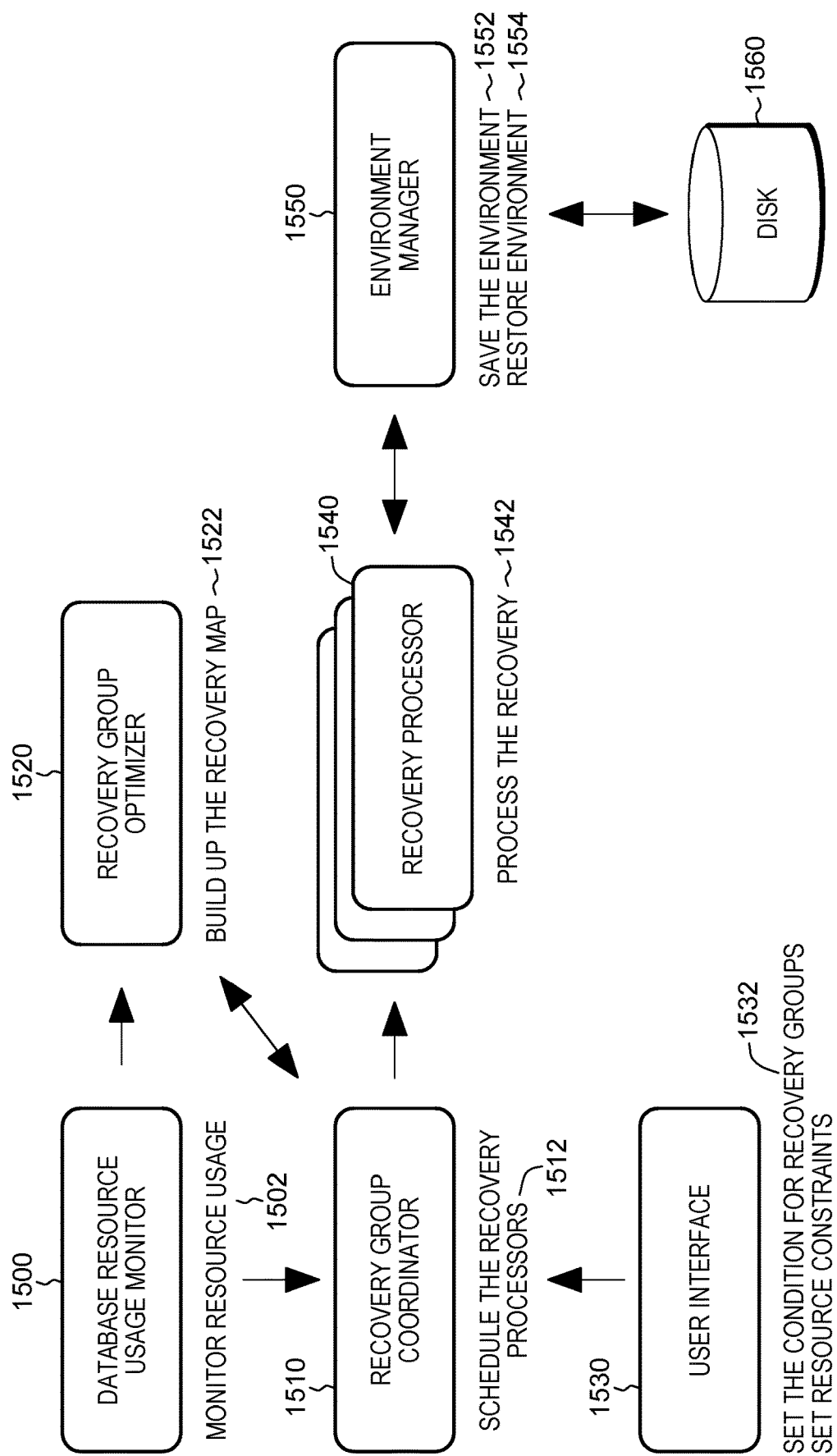
FIG. 15 depicts further details of a recovery schedule process, in accordance with one or more aspects of the present invention.

Aspects of controlling recovery, including changing priority of one or more recovery groups, are described with reference to FIGS. 14-15. In one embodiment, referring to FIG. 14, resource usage is monitored, and the recovery groups are controlled based on the monitoring (1400). For instance, referring to FIG. 15, a database resource usage monitor 1500 (e.g., database resource usage monitor 160) monitors resource usage (1502) and provides information regarding resource usage to a recovery group coordinator 1510 (e.g., recovery group coordination engine 165) and to a recovery group optimizer 1520 (e.g., recovery group optimization engine 170). Recovery group optimizer 1520 builds (1522) a recovery plan (also referred to as a recovery map) and provides the recovery plan to recovery group coordinator 1510.

Recovery group coordinator 1510 obtains (e.g., receives, is provided, retrieves, etc.) the resource usage from database resource usage monitor 1500, the recovery plan from recovery group optimizer 1520 and optionally, additional information from a user interface 1530. This additional information includes, for instance, one or more conditions set for the recovery groups 1532 and/or one or more resource constraints 1534. Based on the obtained information, recovery group coordinator 1512 schedules one or more recovery processors 1540 (e.g., recovery processor(s) 175) to perform recovery 1542. This includes, for instance, forward log recovery, backward log recovery, end restart, and/or other recovery that may be performed.

Further, during recovery, an environment manager 1550 (e.g., environment management engine 180) saves information 1552 in storage 1560 regarding the recovery of recovery groups, in case the recovery is interrupted. If the recovery is interrupted and is to be restored, environment manager 1550 retrieves the stored information 1554 from storage 1560 and provides it to one or more recovery processors 1540 to continue the recovery.

Returning to FIG. 14, as indicated, as part of recovery, the recovery environment is saved and used to restore one or more recovery groups, if needed (1410). In one embodiment, an estimation is made of the endpoint, and the recovery process is controlled based on the relationship between recovery groups (1420). For instance, a recovery plan is devised. However, depending on one or more criteria (such as resource usage; change of priority as indicated by, for instance, a user; and/or additional, fewer and/or other criteria), priority of a recovery group may be changed (1430). For instance, priority of a recovery group of a workload may be promoted (e.g., given a higher priority than it had before, such as from low priority to medium priority, from low priority to high priority, from medium priority to high priority), demoted (e.g., given a lower priority than it had before, such as from medium priority to low priority, from high priority to medium priority, from high priority to low priority), and/or a recovery group may be swapped with a recovery group of a different workload (see, e.g., FIG. 13), as examples.

Although various aspects and components are indicated above, these are just examples. Additional, fewer and/or other aspects and/or components may be included in one or more aspects of database recovery.

As described herein, a database recovery technique is provided that accelerates a recovery time window for high priority workloads. The technique includes, for instance, dynamically detecting log data set distributions for one or more database objects; building a bootstrap data set to ensure recovery of database objects by groups; multi-checkpoints for different database groups; dynamically promoting or demoting priorities of recovery groups and/or swapping groups of different workloads; and/or controlling the recovery process depending on, e.g., resource usage. In one embodiment, with various recovery groups available, additional workloads may be started as online jobs.

Although various embodiments are described herein, other variations and embodiments are possible. It should be noted that, unless otherwise inconsistent, each aspect or feature described herein, and variants thereof, may be combinable with any other aspect or feature.

One or more aspects of the present invention are inextricably tied to computer technology and facilitate processing within a computer, improving performance thereof. In one example, database recovery is facilitated providing efficiencies in recovery and improving system performance.

Aspects of one embodiment of facilitating processing within a computing environment, as related to one or more aspects of database recovery processing, are described with reference to FIGS. 16A-16C.

In one aspect, with reference to FIG. 16A, a database workload is divided into a plurality of workload groups (1600). A workload group of the plurality of workload groups is selected for recovery (1602). The selecting the workload group for recovery is based on a priority of the workload group (1604). One or more recovery actions are performed for the workload group selected for recovery (1606).

As an example, the workload group includes one or more database objects of the database workload (1608).

In one example, the database workload includes a plurality of database objects (1610), and the dividing the database workload includes, for instance, determining, based on one or more rules and one or more attributes, a plurality of service classes for the database workload (1612), and assigning the plurality of database objects of the database workload to the plurality of service classes (1614). The assigning is based on, for instance, one or more priorities of the plurality of database objects and a plurality of priorities of the plurality of service classes (1616). The workload group selected for recovery includes one or more database objects of a selected service class (1618).

In one embodiment, with reference to FIG. 16B, a log data set is provided for the workload group selected for recovery (1630). The log data set is associated with the selected service class (1632), and the log data set has a bootstrap data set associated therewith (1634).

In one embodiment, a plurality of log data sets is provided for the plurality of service classes (1636). The plurality of service classes includes the plurality of workload groups (1638). Each log data set of the plurality of log data sets has a corresponding bootstrap data set (1640).

As an example, the priority of the workload group selected for recovery is a high priority relative to other priorities of other workload groups of the plurality of workload groups (1642). Further, as one example, the performing one or more recovery actions includes recovering one or more log records of a log data set of the workload group selected for recovery (1644).

In one embodiment, with reference to FIG. 16C, the workload group selected for recovery is at least a part of a recovery group of a log data set to which the workload group is assigned (1650). The recovery group includes database objects of the log data set (1652), and the database objects include one or more database objects of the workload group selected for recovery (1654). In one example, at least multiple workload groups of the plurality of workload groups are assigned to multiple log data sets (1656). The multiple log data sets include multiple recovery groups (1658), and the multiple recovery groups have multiple priorities associated therewith (1660).

In one example, a priority of a chosen recovery group of the multiple recovery groups is changed to adjust a start of recovery for one or more workload groups that are a part of the chosen recovery group (1662). As an example, the changing of the priority is based on at least resource usage of the computing environment (1664).

Other embodiments, aspects and/or variations are possible.

Figure 17A:
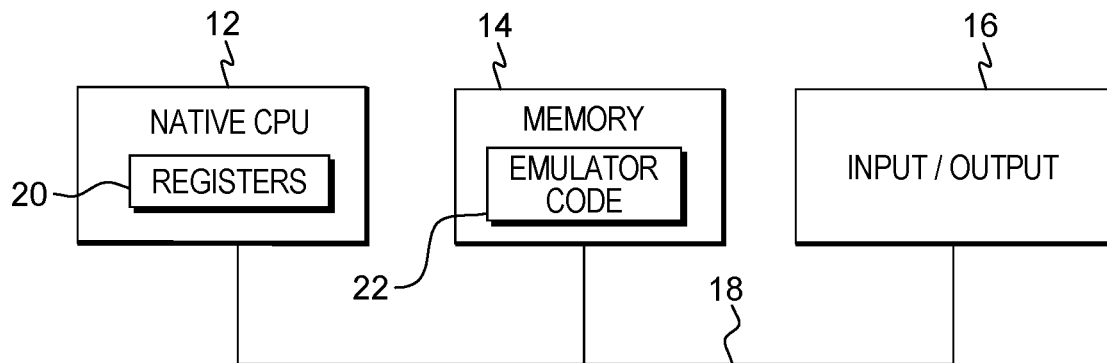
FIG. 17A depicts another example of a computing environment in which to incorporate and use one or more aspects of the present invention.

Various types of computing environments may incorporate and use one or more aspects of the present invention, including, but not limited to, emulation environments, an example of which is described with reference to FIG. 17A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, for instance, the z/Architecture® hardware architecture offered by International Business Machines Corporation, such as PowerPC® processors, HP Superdome servers or others, to emulate, for instance, the z/Architecture® hardware architecture and to execute software and instructions developed based on, for instance, the z/Architecture® hardware architecture. Z/ARCHITECTURE is a trademark or registered trademark of International Business Machines Corporation in at least one jurisdiction.

Figure 17B:
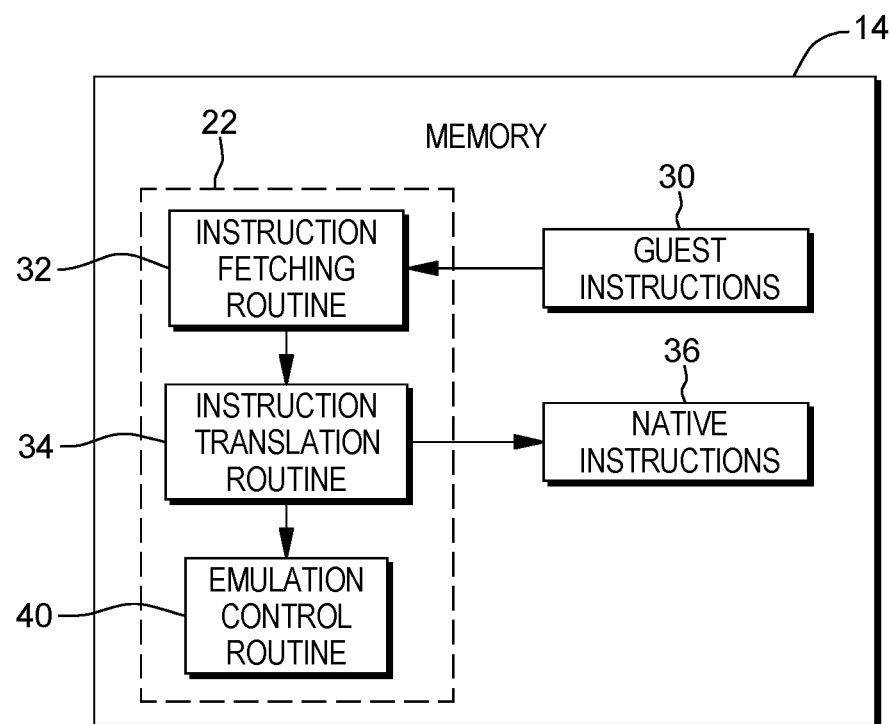
FIG. 17B depicts further details of the memory of FIG. 17A, in accordance with one or more aspects of the present invention.

Further details relating to emulator code 22 are described with reference to FIG. 17B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture® hardware architecture, but instead, are being emulated on native CPU 12, which may be, for example, an Intel® Itanium® II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

One or more aspects of the present invention may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
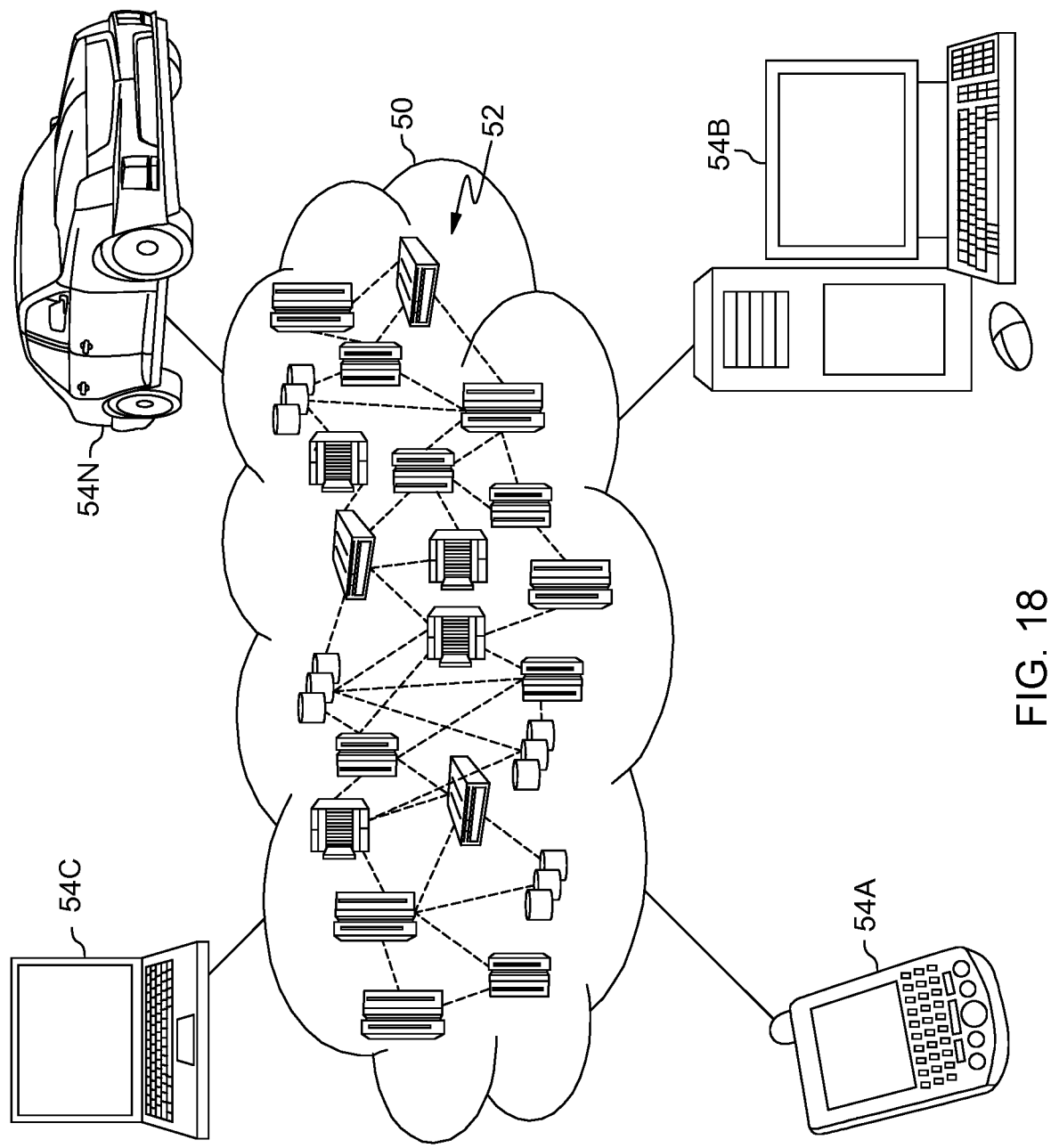
FIG. 18 depicts one embodiment of a cloud computing environment, in accordance with one or more aspects of the present invention.

Referring now to FIG. 18, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 52 and cloud computing environment 50 can communicate with any type of computerized device over any type of network and/or network addressable connection (e.g., using a web browser).

Figure 19:
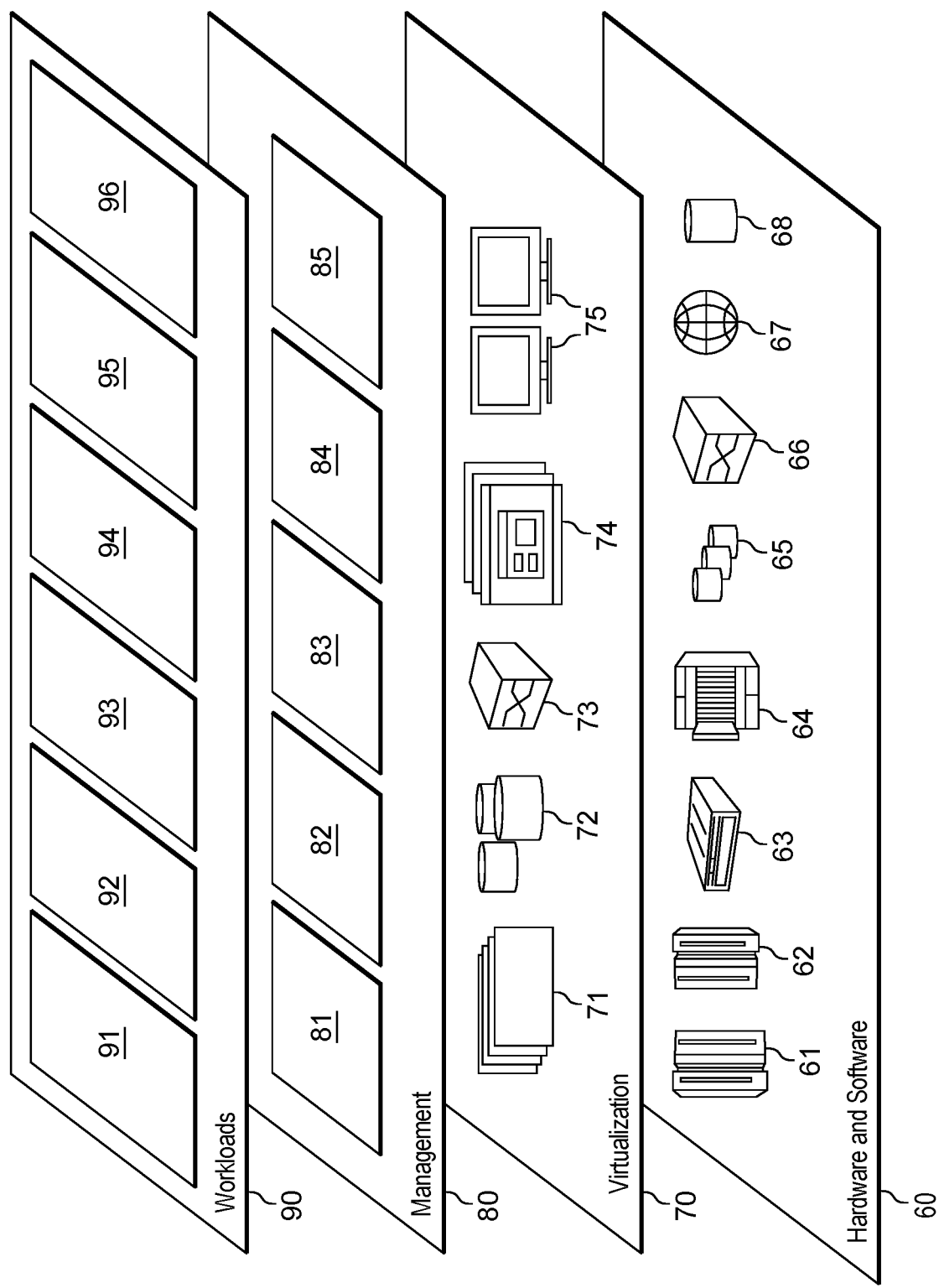
FIG. 19 depicts one example of abstraction model layers, in accordance with one or more aspects of the present invention.

Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database recovery processing 96.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for database recovery processing, in accordance with one or more aspects of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      dividing a database workload comprising a plurality of database objects into a plurality of workload groups, wherein the dividing the database workload includes:
         determining, based on one or more classification rules and one or more attributes for the classification rules, a plurality of service classes for the database workload; and
         assigning the plurality of database objects of the database workload to the plurality of service classes, the assigning being based on one or more priorities of the plurality of database objects and a plurality of priorities of the plurality of service classes;
      assigning one or more database objects of a selected service class of the plurality of service classes to a log data set, wherein the one or more database objects of the selected service class have a same priority and the log data set has a priority assigned thereto and wherein one or more other database objects of another service class have a different priority than the priority of the one or more database objects and are assigned to a different log data set, the different log data set having a different priority assigned thereto than the priority of the log data set;
      selecting a workload group of the plurality of workload groups for recovery, the selecting the workload group for recovery being based on a priority of the workload group, and wherein the workload group selected for recovery includes the one or more database objects of the selected service class; and
      performing one or more recovery actions for the workload group selected for recovery, the performing using the log data set assigned to the one or more database objects of the workload group.

2. The computer program product of claim 1, wherein the plurality of database objects includes one or more database tables and one or more pages of a database.

3. The computer program product of claim 1, wherein the classification rules include at least one classification rule selected from a group consisting of service class period, service class duration, service class goal description and service class importance.

4. The computer program product of claim 1, wherein the log data set has a bootstrap data set associated therewith.

5. The computer program product of claim 1, wherein the method further comprises providing a plurality of log data sets for the plurality of service classes, the plurality of service classes including the plurality of workload groups, and wherein each log data set of the plurality of log data sets has a corresponding bootstrap data set.

6. The computer program product of claim 1, wherein the priority of the workload group selected for recovery comprises a high priority relative to other priorities of other workload groups of the plurality of workload groups.

7. The computer program product of claim 1, wherein the performing one or more recovery actions includes recovering one or more log records of the log data set of the workload group selected for recovery.

8. The computer program product of claim 1, wherein the workload group selected for recovery is at least a part of a recovery group of the log data set to which the workload group is assigned, the recovery group including database objects of the log data set, the database objects including the one or more database objects of the workload group selected for recovery, and wherein at least multiple workload groups of the plurality of workload groups are assigned to multiple log data sets, the multiple log data sets including multiple recovery groups, the multiple recovery groups having multiple priorities associated therewith.

9. The computer program product of claim 8, wherein the method further comprises changing a priority of a chosen recovery group of the multiple recovery groups to adjust a start of recovery for one or more workload groups that are a part of the chosen recovery group.

10. The computer program product of claim 1, wherein the method further comprises determining a log offload schedule for logs to be archived, wherein a log data set with a highest priority relative to other log data sets is to be read prior to the other data sets.

11. A computer system for facilitating processing within a computing environment, the computer system comprising:
   a memory; and
   at least one processor in communication with the memory, wherein the computer system is configured to perform a method, said method comprising:
      dividing a database workload comprising a plurality of database objects into a plurality of workload groups, wherein the dividing the database workload includes:
         determining, based on one or more classification rules and one or more attributes for the classification rules, a plurality of service classes for the database workload; and
         assigning the plurality of database objects of the database workload to the plurality of service classes, the assigning being based on one or more priorities of the plurality of database objects and a plurality of priorities of the plurality of service classes;
      assigning one or more database objects of a selected service class of the plurality of service classes to a log data set, wherein the one or more database objects of the selected service class have a same priority and the log data set has a priority assigned thereto and wherein one or more other database objects of another service class have a different priority than the priority of the one or more database objects and are assigned to a different log dataset, the different log data set having a different priority assigned thereto than the priority of the log data set;

selecting a workload group of the plurality of workload groups for recovery, the selecting the workload group for recovery being based on a priority of the workload group, and wherein the workload group selected for recovery includes the one or more database objects of the selected service class; and performing one or more recovery actions for the workload group selected for recovery, the performing using the log data set assigned to the one or more database objects of the workload group.

12. The computer system of claim 11, wherein the plurality of database objects includes one or more database tables and one or more pages of a database.

13. The computer system of claim 11, wherein the method further comprises providing a plurality of log data sets for the plurality of service classes, the plurality of service classes including the plurality of workload groups, and wherein each log data set of the plurality of log data sets has a corresponding bootstrap data set.

14. The computer system of claim 11, wherein the workload group selected for recovery is at least a part of a recovery group of the log data set to which the workload group is assigned, the recovery group including database objects of the log data set, the database objects including the one or more database objects of the workload group selected for recovery, and wherein at least multiple workload groups of the plurality of workload groups are assigned to multiple log data sets, the multiple log data sets including multiple recovery groups, the multiple recovery groups having multiple priorities associated therewith.

15. The computer system of claim 14, wherein the method further comprises changing a priority of a chosen recovery group of the multiple recovery groups to adjust a start of recovery for one or more workload groups that are a part of the chosen recovery group.

16. A computer-implemented method of facilitating processing within a computing environment, the computer-implemented method comprising:

dividing a database workload comprising a plurality of database objects into a plurality of workload groups, wherein the dividing the database workload includes:
determining, based on one or more classification rules and one or more attributes for the classification rules, a plurality of service classes for the database workload; and assigning the plurality of database objects of the database workload to the plurality of service classes, the assigning being based on one or more priorities of the plurality of database objects and a plurality of priorities of the plurality of service classes;

assigning one or more database objects of a selected service class of the plurality of service classes to a log data set, wherein the one or more database objects of the selected service class have a same priority and the log data set has a priority assigned thereto and wherein one or more other database objects of another service class have a different priority than the priority of the one or more database objects and are assigned to a different log data set, the different log dataset having a different priority assigned thereto than the priority of the log data set;

selecting a workload group of the plurality of workload groups for recovery, the selecting the workload group for recovery being based on a priority of the workload group, and wherein the workload group selected for recovery includes the one or more database objects of the selected service class; and performing one or more recovery actions for the workload group selected for recovery, the performing using the log data set assigned to the one or more database objects of the workload group.

17. The computer-implemented method of claim 16, wherein the plurality of database objects includes one or more database tables and one or more pages of a database.

18. The computer-implemented method of claim 16, further comprising providing a plurality of log data sets for the plurality of service classes, the plurality of service classes including the plurality of workload groups, and wherein each log data set of the plurality of log data sets has a corresponding bootstrap data set.

19. The computer-implemented method of claim 16, wherein the workload group selected for recovery is at least a part of a recovery group of the log data set to which the workload group is assigned, the recovery group including database objects of the log data set, the database objects including the one or more database objects of the workload group selected for recovery, and wherein at least multiple workload groups of the plurality of workload groups are assigned to multiple log data sets, the multiple log data sets including multiple recovery groups, the multiple recovery groups having multiple priorities associated therewith.

20. The computer-implemented method of claim 19, further comprising changing a priority of a chosen recovery group of the multiple recovery groups to adjust a start of recovery for one or more workload groups that are a part of the chosen recovery group.

* * * * *